United States Patent
Jacobsson

(10) Patent No.: US 9,542,450 B1
(45) Date of Patent: Jan. 10, 2017

(54) SELECTING CONTENT USING ENTITY PROPERTIES

(71) Applicant: Google Inc., Mountain View, CA (US)

(72) Inventor: Henrik Jacobsson, Zurich (CH)

(73) Assignee: Google Inc., Mountain View, CA (US)

( * ) Notice: Subject to any disclaimer, the term of this patent is extended or adjusted under 35 U.S.C. 154(b) by 212 days.

(21) Appl. No.: 14/242,590

(22) Filed: Apr. 1, 2014

(51) Int. Cl.
  *G06F 17/30* (2006.01)
(52) U.S. Cl.
  CPC ................................. *G06F 17/3053* (2013.01)
(58) Field of Classification Search
  None
  See application file for complete search history.

(56) References Cited

U.S. PATENT DOCUMENTS

| | | | |
|---|---|---|---|
| 8,073,803 B2 | 12/2011 | Murdock et al. | |
| 8,380,721 B2 | 2/2013 | Attaran Rezaei et al. | |
| 8,566,160 B2 | 10/2013 | Zhang et al. | |
| 8,583,659 B1* | 11/2013 | Alexandrescu ... | G06F 17/30958 707/705 |
| 2010/0057559 A1 | 3/2010 | Wilf et al. | |
| 2011/0313843 A1 | 12/2011 | Rounthwaite et al. | |
| 2012/0059713 A1 | 3/2012 | Galas et al. | |
| 2012/0317088 A1 | 12/2012 | Pantel et al. | |
| 2013/0173639 A1 | 7/2013 | Chandra et al. | |
| 2013/0211905 A1 | 8/2013 | Qin et al. | |
| 2014/0046934 A1* | 2/2014 | Zhou ................. | G06F 17/30991 707/723 |

* cited by examiner

*Primary Examiner* — Hung Q Pham

(74) *Attorney, Agent, or Firm* — Fish & Richardson P.C.

(57) ABSTRACT

Systems and methods of the disclosure relate to selecting content via a computer network. A search query provided by a user device can be received. An entity of a search query, a corresponding confidence score, and a property can be identified via a data structure having information about entities. A match between a property of an entity of content selection criteria and the property of the entity of the search query can be determined. The content item can be selected as a candidate for display on the user device based on the match and the confidence score.

10 Claims, 8 Drawing Sheets

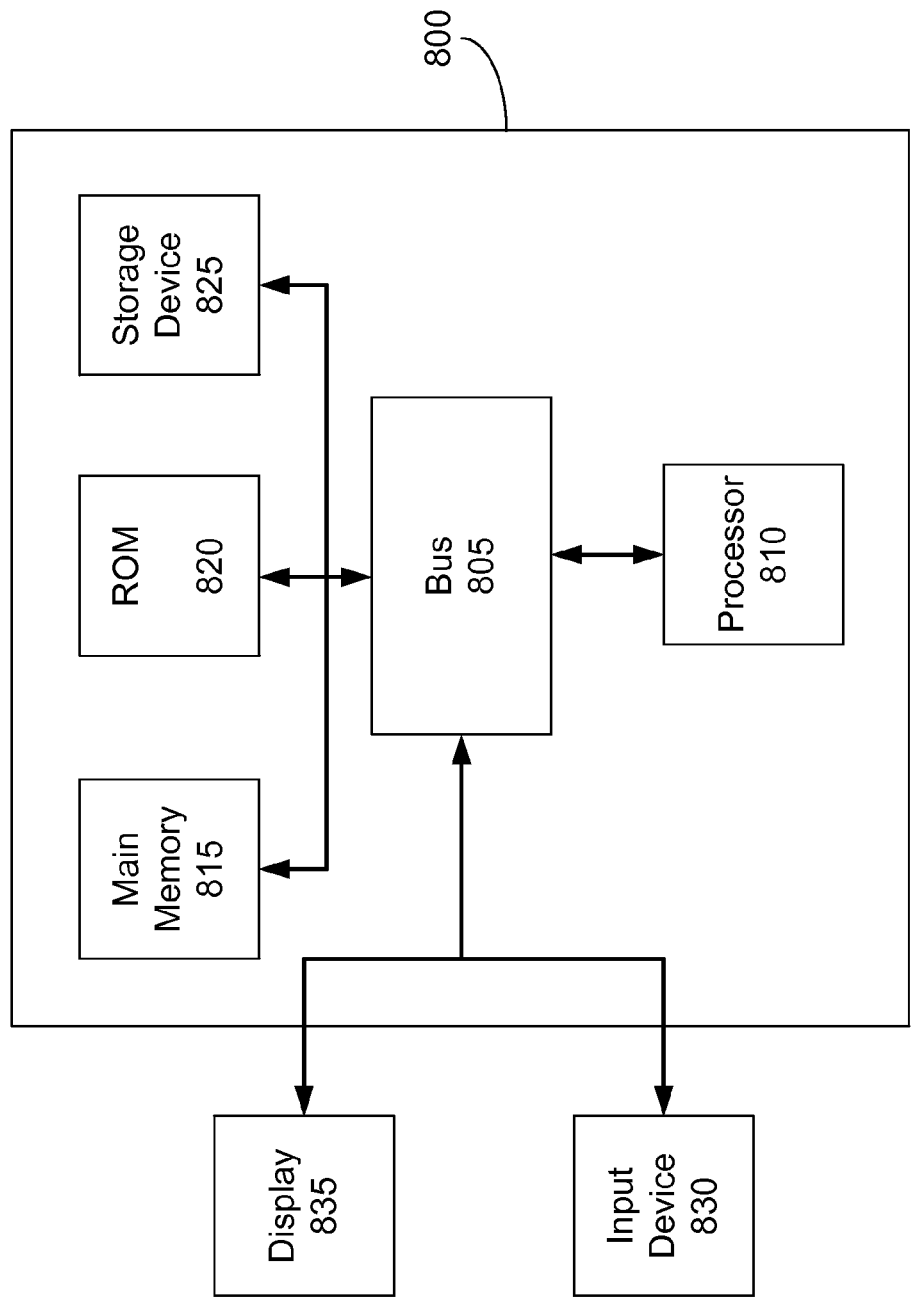

SELECTING CONTENT USING ENTITY PROPERTIES

BACKGROUND

In a networked environment such as the Internet, web publishers such as people or companies can provide information for display on web pages or other documents. The web pages can include text, video, or audio information provided by the entities via a web page server for display on the internet. Content providers, such as third party advertisers, can provide additional content for display on the web pages together with the information provided by the web publishers. A content selection server may select certain additional content to display on a rendering of a web page based on various factors including, e.g., content selection criteria associated with the content to be displayed. Thus, a person viewing a web page can access the information that is the subject of the web page, as well as selected third party content that may appear with the web page.

SUMMARY

At least one aspect is directed to a method of selecting content for display on a user device via a computer network. The method can include a data processing system receiving a search query provided via a user device. The data processing system can include one or more processors. The method can include a query reference module of the data processing system identifying, via a data structure having information about entities, an entity of the search query and a corresponding confidence score. The method can include identifying a property of the entity of the search query. The method can include the data processing system determining a match between a property of an entity of content selection criteria and the property of the entity of the search query. The method can include the data processing system selecting the content item as a candidate for display on the user device based on the match and the confidence score.

In some implementations, the property of the entity of the search query includes a second entity and a relation between the entity and the second entity.

In some implementations, the property of the entity of the search query includes a query graph and the property of the entity of the content selection criteria includes a content selection criteria graph. In some implementations, the method includes the data processing system comparing, on a node-by-node basis, the content selection criteria graph with the query graph to determine the match.

In some implementations, the method includes the data processing system determining the match based on a query graph of the entity of the search query and a content selection criteria graph of the entity of the content selection criteria.

In some implementations, the method includes the data processing system translating properties of the entity of the search query into a flat data structure. The flat data structure can include information associated with the properties. The method can include the data processing system identifying, using the flat data structure, a plurality of content selection criteria associated with the flat data structure. In some implementations, the method includes the data processing system comparing each of the plurality of content selection criteria with the properties of the entity of the query to identify matching content selection criteria.

In some implementations, the method includes the data processing system mapping the property of the content selection criteria onto the property of the entity of the query. In some implementations, the confidence score indicates a semantic relevancy of the entity to the search query. In some implementations, the method includes the data processing system determining that the confidence score exceeds the threshold.

At least one aspect is directed to a method of selecting content for display on a user device via a computer network. In some implementations, the method includes a data processing system having one or more processors receiving a search query provided via a user device. The method can include the data processing system (e.g., via a query reference module) identifying, via a data structure having information about entities, an entity of the search query and a corresponding confidence score. The data processing system can generate a query graph having linked nodes. A node of the query graph can include the entity and a property of the entity. The method can include the data processing system retrieving a content selection criteria graph for a content item of a content provider. The content selection criteria graph can include a linked node. The method can include the data processing system determining a match between the content selection criteria graph and the query graph. The method can include the data processing system selecting the content item as a candidate for display on the user device. The data processing system can select the content item as a candidate for display on the user device based on the match and the confidence score.

In some implementations, the method includes the data processing system generating the query graph using a commercially relevant subset of the data structure having information about entities. In some implementations, the method includes the data processing system selecting the content item as a candidate for display responsive to the match and the confidence score satisfying a threshold.

In some implementations, the method includes the data processing system comparing the content selection criteria graph with the query graph. The method may include comparing the content selection criteria graph with the query graph on a node-by-node basis. In some implementations, the method includes matching a topology of the content selection criteria graph with the query graph.

In some implementations, the method includes translating the query graph into a flat data structure. The flat data structure can include information associated with the query graph. In some implementations, the method includes a search module identifying multiple content selection criteria graphs associated with the flat data structure. The search module may use the flat data structure to make this identification. In some implementations, the method includes comparing each of the of the content selection criteria graphs with the query graph to identify a matching content selection criteria graph. In some implementations, the method includes determining that the content selection graph fits within the query graph.

In some implementations, the confidence score indicates a semantic relevancy of the entity to the search query. In some implementations, the method includes determining that the confidence score exceeds the threshold. In some implementations, the method includes the data processing system identifying multiple interpretations of the search query. The multiple interpretations can each include at least one entity. Each entity can include a corresponding confidence score. The method may include the data processing system filtering the multiple interpretations based on the corresponding confidence score of the at least one entity of the multiple interpretations.

At least one aspect is directed to a system for selecting content for display on a user device via a computer network. In some implementations, the system includes a data processing system having one or more processors. The data processing system can include an interface module configured to receive a search query provided via a user device. The system can include a query reference module configured to identify, via a data structure having information about entities, an entity of the search query and a corresponding confidence score. The system can also be configured to identify a property of the entity of the search query. The system can include a matching module configured to determine a match between a property of an entity of content selection criteria and the property of the entity of the search query. The system can include a content selector configured to select the content item as a candidate for display on the user device based on the match and the confidence score.

At least one aspect is directed to a system for selecting content for display on a user device via a computer network. The system can include a data processing system having one or more processors. In some implementations, the system includes an interface module configured to receive a search query provided via a user device. In some implementations, the system includes a query reference module configured to identify, via a data structure having information about entities, an entity of the search query and a corresponding confidence score. The query reference module can be further configured to generate a query graph comprising linked nodes. A node of the query graph can include the entity. The data processing system can be further configured to retrieve a content selection criteria graph for a content item of a content provider. The content selection criteria graph can include a linked node. The system can include a matching module configured to determine a match between the content selection criteria graph and the query graph. The system can include a content selector configured to select the content item as a candidate for display on the user device responsive to the match and the confidence score satisfying a threshold.

In some implementations, the property of the entity of the search query includes a second entity and a relation between the entity and the second entity. In some implementations, the property of the entity of the search query comprises a query graph.

At least one aspect is directed to a computer-readable storage device having processor executable instructions to select content via a computer network. The instructions can include instructions to receive a search query provided via a user device. The instructions can include instructions to identify an entity of the search query and a corresponding confidence score. The instructions can include instructions to identify a property of the entity of the search query. The instructions can include instructions to determine a match between a property of an entity of content selection criteria and the property of the entity of the search query. The instructions can include instructions to select the content item as a candidate for display on the user device based on the match and the confidence score.

At least one aspect is directed to a non-transitory computer-readable medium comprising processor executable instructions to select content via a computer network. In some implementations, the instructions include instructions to receive a search query provided via a user device. In some implementations, the instructions include instructions to identify an entity of the search query and a corresponding confidence score. The instructions can include instructions to access a data structure having information about entities to generate a query graph with linked nodes. A node of the query graph can include the entity. The instructions can include instructions to retrieve a content selection criteria graph for a content item of a content provider. The content selection criteria graph can include a linked node. The instructions can include instructions to determine a match between the content selection criteria graph and the query graph. The instructions can include instructions to select the content item as a candidate for display on the user device responsive to the match and the confidence score satisfying a threshold.

At least one aspect is directed to a method of selecting content for display on a user device. The method can include a data processing system having one or more processors receiving a query to generate content selection criteria. The method can include one or more processors receiving an indication to generate content selection criteria based on target content. The method can include the one or more processors identifying an entity of the target content and a property of the entity. The method can include the one or more processors accessing, in a database, a template having a topology and a named variable corresponding to the property of the entity. The method can include the one or more processors determining, based on the named variable and the topology of the template, semantic criteria matching the property of the entity. The method can include the one or more processors selecting candidate content selection criteria based on a statistical metric of each of the matching semantic criteria.

In some implementations, the method includes identifying a plurality of entities of the query and a corresponding confidence score for each of the plurality of entities. The method may include determining that at least one of the plurality of entities satisfy a threshold based on the corresponding confidence score. The method can include selecting the property associated with the at least one of the plurality of entities.

In some implementations, the template includes a first named variable and a second named variable. The method may include identifying a first plurality of semantic criteria for the first named variable and a second plurality of semantic criteria for the second named variable. The method may include determining a Cartesian product based on the first and second plurality of semantic criteria.

In some implementations, the target content includes multiple queries. The method may include determining, for the semantic criteria, a term frequency based on the plurality of queries. The method may include determining, for the semantic criteria, an inverse query frequency.

In some implementations, the method may include the data processing system providing the candidate criteria for display to a content provider. The method may include the data processing system receiving a selection of the candidate criteria. The method may include associating the selected candidate criteria with the content group.

In some implementations, the method may include receiving target content that includes a plurality of queries. Content selection criteria can be generated for a content group based on the plurality of queries. In some implementations, the method may include receiving an indication of an online document of the content provider. The method may include using the online document to generate content selection criteria for a content group. In some implementations, the method may include receiving target content that includes queries based on historical traffic directed to an online document of a content provider. The method may include using the historical queries to generate candidate content selection criteria.

In some implementations, the method may include ranking the matching semantic criteria based on the statistical metric. The method may include selecting the candidate content selection criteria based on the rank. In some implementations, the topology includes a property associated with the named variable.

At least one aspect is directed to a method of selecting content for display on a user device. The method can include a data processing system having one or more processors receiving a query to generate content selection criteria. The method can include a query reference module of the data processing system identifying an entity of the query and a query graph based on the entity. The method can include the data processing system accessing a database to identify a template corresponding to the query graph. The template can include a topology and a named variable. The method can include the data processing system determining, based on the named variable and the topology of the template, a plurality of semantic criteria matching the query graph. The method can include the data processing system using a statistical metric of each of the matching semantic criteria to select candidate content selection criteria.

At least one aspect is directed to a system for selecting content for display on a user device via a computer network. The system can include a data processing system having one or more processors. In some implementations, the system includes an interface module configured to receive a query to generate content selection criteria. The system can include a query reference module configured to identify an entity of the query to generate a query graph. The system can include a lookup module configured to access a database to identify a template having a topology and a named variable corresponding to the query graph. The system can be further configured to determine, based on the named variable and the topology of the template, a plurality of semantic criteria matching the query graph. The system can include a matching module configured to use a statistical metric of each of the matching semantic criteria to select candidate content selection criteria.

At least one aspect is directed to a system for selecting content for display on a user device via a computer network. The system can include a data processing system having one or more processors. In some implementations, the system includes an interface module configured to receive an indication to generate content selection criteria based on target content. The system can include a query reference module configured to identify an entity of the target content and a property of the entity. The system can include a lookup module configured to access a database to identify a template having a topology and a named variable corresponding to the property of the entity. The system can be further configured to determine, based on the named variable and the topology of the template, a plurality of semantic criteria matching the property of the entity. The system can include a matching module configured to use a statistical metric of each of the matching semantic criteria to select candidate content selection criteria.

At least one aspect is directed to a non-transitory computer-readable medium comprising processor executable instructions to select content via a computer network. In some implementations, the instructions include instructions to receive an indication to generate content selection criteria based on target content. The instructions can include instructions to identify an entity of the target content and a property of the entity. The instructions can include instructions to access, in a database, a template. The template can include a topology and a named variable. The instructions can include instructions to determine, based on the named variable and the topology of the template, a plurality of semantic criteria matching the property of the entity. The instructions can include instructions to use a statistical metric of each of the matching semantic criteria to select candidate content selection criteria.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 8 is a block diagram illustrating a general architecture for a computer system that may be employed to implement various elements of the systems and methods described herein, in accordance with an implementation.

Like reference numbers and designations in the various drawings indicate like elements.

DETAILED DESCRIPTION

Figure 1:
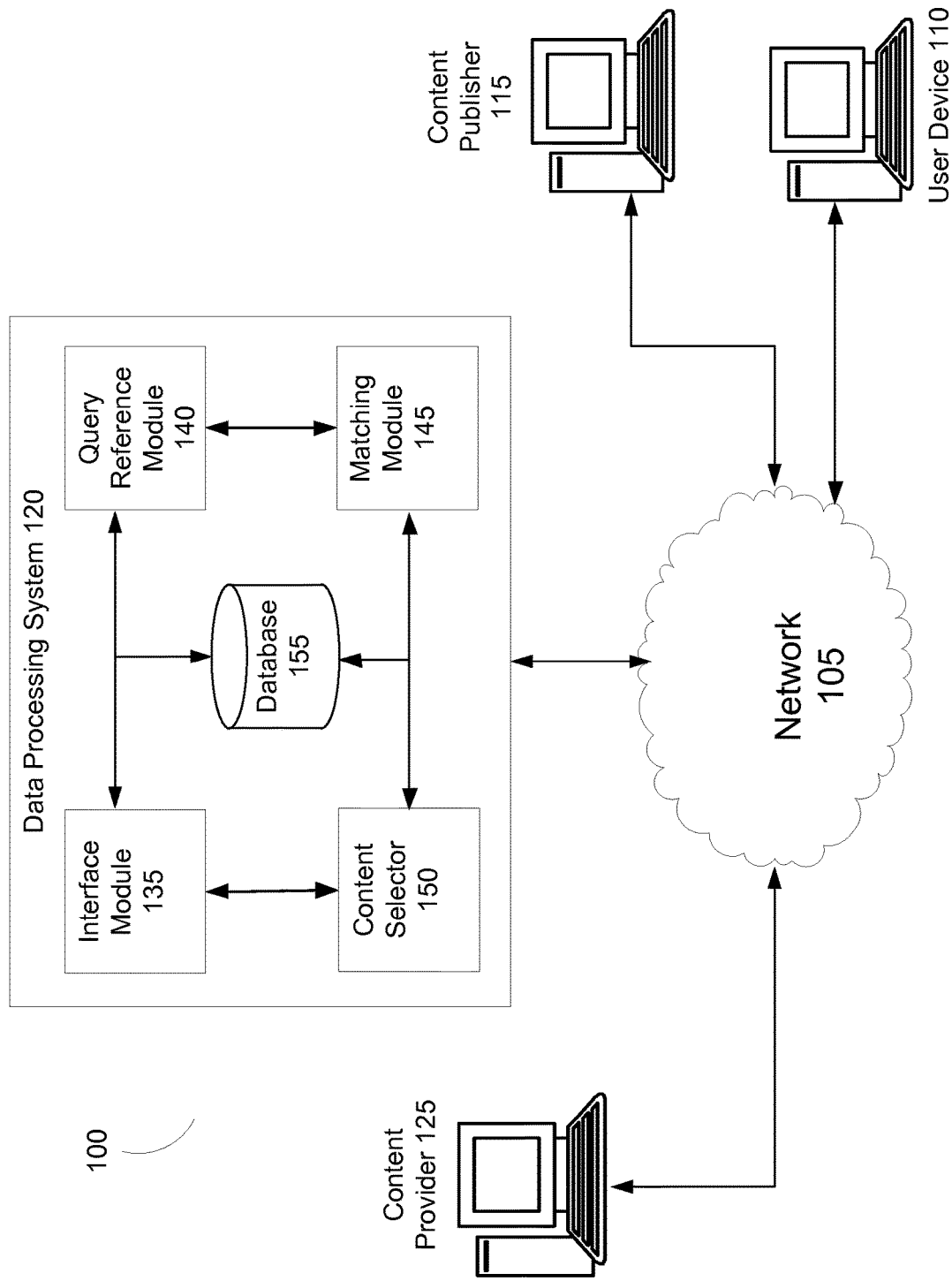
FIG. 1 is an illustration of one implementation of a system for selecting content via a computer network.

Systems and methods of this disclosure are directed generally towards selecting online content for display alongside search query results. The systems and methods can generate or use a form of selection criteria that is based on properties of entities mentioned in queries, rather than based on keywords and synonyms of keywords mentioned in queries. In some implementations, the systems and methods use information from a content provider to create content selection criteria, receive a user query, generate a dynamic set of entities corresponding to the content selection criteria and a dynamic set of entities corresponding to the search query, and determine whether the set of entities of the search query matches the set of entities of the content selection criteria.

In an illustrative implementation, a content provider may provide the following content selection criteria "all queries that mention books by Person X". The system may first identify an entity of the criteria (e.g., Person X). The entity may correspond to a unique entity identifier. The system may then access a data structure providing structured and detailed information about persons, places or things associated with unique entity identifiers. The system may use the data structure to identify properties of the entity ID, such as a second entity and its relation to the entity. The entity "Person X" may be related to a book "Title Y" and the relation may be "author of". The entity "Person X" may also be related to a movie "Title Z" and the relation may be "producer of". The system may identify, use or obtain the properties, generate a subset of the data structure based on the content providers content selection criteria.

Thereafter, the system may receive a search query provider via a user device. The system can identify one or more entities of the search query. The system can further identify properties of the entity of the search query using the data structure having entity information. The system may annotate or otherwise associate this information with one or more entities of the search query. In an illustrative implementation, the data structure having entity information may include an entity graph, and the system may generate a replica of a subset of the entity graph where the search query of the user is inserted as a node in the replica, thus creating a search query graph.

In another illustrative implementation, if the search query provided by the user was "Album X", the system can determine at serving time that the query is about a specific entity, that the entity is an album by "Singer Y", that the album has a song titled "Song Z", the album was produced in 1983, etc. Thus, all of these properties are eligible for use as content selection criteria. The system can identify the following content selection criteria as a match: "all queries mentioning Albums by Singer Y".

In some implementations, the system receives a search query input into a search engine via a user device. Using the received user search query, the system generates a replica of a subset of an entity graph corresponding to the entities mentioned in the search query, where the search query is inserted as a node in the replica. The technology then matches this replica entity graph with other entity graphs corresponding to a content provider's content selection criteria. If the entity graph corresponding to the content provider's content selection criteria maps onto the search query entity graph or otherwise matches the replica entity graph, then it is a match. The system may then select content items of the content provider corresponding to the matching entity graph.

In some implementations, the systems and methods create content selection criteria used to select online advertisements for display on a user device alongside search engine results. Target content provided by a content provider, such as a set of illustrative queries (or a landing page) can be used to generate semantic criteria based on extracted semantic features of the target content, queries or landing page provided by the content provider.

In some implementations, target content or illustrative queries (or a landing page) is received from the advertiser. In an illustrative implementations, the illustrative queries may include a list of books by an author. Semantic features of the illustrative queries can be extracted to determine whether these extracted semantic features are significantly more common than random chance (e.g., rank odds ratio of each matching criteria). In some implementations, the system analyzes the list of books to identify the following matching criteria: the books were all authored by "Author X", take place in the same fictional universe, are all fantasy books, etc. The system can prompt the advertiser with these extracted semantic features and their associated entities. The system can also show the advertiser what user search queries would trigger a match, and provide an estimate of traffic volume.

FIG. 1 illustrates one implementation of a system 100 for selecting content via a computer network such as network 105. The system 100 and its components, such as a data processing system 120, may include hardware elements, such as one or more processors, logic devices, or circuits. The network 105 can include computer networks such as the Internet, local, wide, metro, data, or other area networks, intranets, satellite networks, combinations thereof, and other communication networks such as voice or data mobile telephone networks. The network 105 can be used to access information resources such as web pages, web sites, domain names, or uniform resource locators that can be displayed on at least one user device 110, such as a laptop, desktop, tablet, personal digital assistant, smart phone, mobile computing devices, mobile telecommunication device, wearable computing device, or portable computer. In one implementation, via the network 105 a user of the user device 110 can access web pages provided by at least one content publisher 115 (e.g., a web site operator). In this implementation, a web browser of the user device 110 can access a web server of the content publisher 115 to retrieve a web page for display on a monitor of the user device 110. The content publisher 115 generally includes an entity that operates the web page. In one implementation, the content publisher 115 includes at least one web page server that communicates with the network 105 to make the web page available to the user device 110.

Although FIG. 1 shows a network 105 between the user device(s) 110, data processing system 120, content provider 125, and content publisher 115, the user device(s) 110, content publisher 115, content provider 125 and data processing system 125 may be on the same network 105. The network 105 can be a local-area network (LAN), such as a company Intranet, a metropolitan area network (MAN), or a wide area network (WAN), such as the Internet or the World Wide Web. In some implementations, there are multiple networks 105 between the user devices 110 and the data processing system 120, content provider 125, and content publisher 115. In one of these implementations, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

The system 100 can include at least one data processing system 120. The data processing system 120 can include at least one logic device such as a computing device having a processor to communicate via the network 105 with the user device 110, the content publisher 115, and at least one content provider 125. The data processing system 120 can include at least one server. In one implementation, the data processing system 120 can include a plurality of servers located in at least one data center. In some implementations, the data processing system 120 may include multiple, logically-grouped servers and facilitate distributed computing techniques. In one of these implementations, the logical group of servers may be referred to as a server farm or a machine farm. In another of these implementations, the servers may be geographically dispersed. In other implementations, a machine farm may be administered as a single entity. In still other implementations, the machine farm includes a plurality of machine farms. The servers within each machine farm can be heterogeneous—one or more of the servers or machines can operate according to one type of operating system platform.

In one implementation, servers in the machine farm may be stored in high-density rack systems, along with associated storage systems, and located in an enterprise data center. In this implementation, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

Management of the machine farm may be de-centralized. In one implementation, one or more servers may comprise components, subsystems and circuits to support one or more management services for the machine farm. In one of these implementations, one or more servers provide functionality for management of dynamic data, including techniques for handling failover, data replication, and increasing the robustness of the machine farm. Each server may communicate with a persistent store and, in some implementations, with a dynamic store.

Server may include a file server, application server, web server, proxy server, appliance, network appliance, gateway, gateway, gateway server, virtualization server, deployment server, secure sockets layer virtual private network ("SSL VPN") server, or firewall. In one implementation, the server may be referred to as a remote machine or a node.

The data processing system 120, content provider 125, content publisher 115, and user device 110 may be deployed or executed on any type of client or server, or any type and form of computing device, such as a computer, network device or appliance capable of communicating on any type and form of network and performing the operations described herein.

In one implementation, the data processing system 120 includes a content placement system having at least one server. The data processing system 120 can also include at least one interface module 135, at least one query reference module 140, at least one matching module 145, at least content selector 150, and at least one database 155. In some implementations, the data processing system includes a search module. The at least one interface module 135, at least one query reference module 140, at least one matching module 145, at least content selector 150, and at least one search module can each include at least one processing unit or other logic device such as programmable logic array engine, or module configured to communicate with the database 155. The at least one interface module 135, at least one query reference module 140, at least one matching module 145, at least content selector 150, and at least one search module can be separate components, a single component, or part of the data processing system 120.

In some implementations, the data processing system 120 obtains anonymous computer network activity information associated with a plurality of user devices 110. A user of a user device 110 can affirmatively authorize the data processing system 120 to obtain network activity information corresponding to the user's user device 110. In one implementation, the data processing system 120 can prompt the user of the user device 110 for consent to obtain one or more types of network activity information, such as geographic location information. The identity of the user of the user device 110 can remain anonymous and the user device 110 may be associated with a unique identifier (e.g., a cookie).

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). In one implementation, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

In one implementation, the data processing system 120 receives content or content items from a content provider 125, such as a commercial entity, online retailer, business, advertiser, individual or any entity that wants to provide content for display on a user device 110 via the computer network 105. The content or content items may include, e.g., text, characters, symbols, images, video, audio, or multimedia content. In one implementation, a content item may include an online advertisement, article, promotion, coupon, or product description. In addition to receiving content from a content provider 125, the data processing system 120 may receive location information (e.g., a redemption location, retail store, restaurant location, point of sale location, etc.) associated with the content provider 125 that provides the content, or the commercial entity associated with the provided content in the event a third-party is providing the content to the data processing system 120 on behalf of a commercial entity (e.g., an advertiser creating and providing advertisements for a retail store). The data processing system 120 can store, in database 150, the location as a location extension. Since a content provider 125 may have multiple content campaigns (e.g., advertisement campaigns that include multiple advertisements for the same or similar landing page), in one implementation, the location extension can be stored in a content selection data structure associated with the content provider 125 rather than each individual content, content campaign or content group (e.g., multiple content having similar keywords or content selection criteria). In one implementation, the location extension can be associated with a content provider's 125 unique identifier when a content provider 125 establishes or sets up a content campaign or provides content to the data processing system 120.

In some implementations, the data processing system 120 includes a content selector 150 designed and constructed to select a content item based on a search query input via user device 110. The data processing system 120 may parse, analyze, match, or otherwise process one or more search terms of the search query to identify one or more candidate content items associated with the search query. In an illustrative implementations, the data processing system 120 may receive a search query comprising the term "pizza". The data processing system 120 may then parse a data structure to identify content items related to pizza, such as advertisements or coupons for pizza restaurants. These content items may be provided by one or more content providers 125. In some implementations, the data processing system 120 may select one or more content items to provide for display on the user device based on, e.g., an online auction, advertisement score, keyword score, location, or other criteria. When the content item is presented to a user via the user device 110, the data processing system may receive an indication of interest in the content item (e.g., a click, selection, etc.). In some implementations, the data processing system 120, responsive to receiving an indication of user interest in the content item, may bill or charge or otherwise request consideration from the content provider 125 associated with the content item.

The data processing system 120 may provide the content item to the web page for display in response to receiving a request for content from a computing device such as, e.g., user device 110. In some implementations, the data processing system 120 receives the request via an application executing on the user device 110. In some implementations, a mobile application executing on a mobile device (e.g., smart phone or tablet) may make a request for content. In some implementations, a web page may request content from the data processing system 120 responsive to a user of a user device 110 visiting the web page. In some implementations, the data processing system 120 may receive a request for content via a search engine and responsive to a user of a user device 110 entering a search query.

In some implementations, the request for content includes information that can facilitate content selection. In some implementations, the data processing system 120 may request information from the user device 110 to facilitate identifying content or selecting content. The data processing system 120 may request or obtain information responsive to receiving a request for content from the user device 110. The information may include information about displaying the content on the user device 110 (e.g., a content slot size or position) or available resources of user device 110 to display or otherwise manipulate the content.

Responsive to a request for content from a web page operator 115, the data processing system 120 provides a content item for display with a web page on a user device 110. A user of the user device 110 may view the content item (e.g., an impression) or may click on or select the content item (e.g., a click). In one implementation, an indication of user interest in the content item may include a click, selection, mouse over, finger gesture, shake motion, voice command, tap, or another indication that indicates user interest in the content item. In some implementations, the indication of user interaction may include the user using the content item (e.g., a coupon) to make a purchase at a redemption location.

In one implementation, the data processing system 120 includes an interface module 135 designed and constructed to receive, access, obtain, transmit, convey or otherwise communicate with one or more component of the data processing system 120 or device (e.g., content provider 125, content publisher 115 and user device 110) via network 105.

In some implementations, the interface module 135 is configured to receive a search query provided via a user device 110. The search query may be input into a search engine of, associated with, or otherwise communicatively coupled to data processing system 120. In some implementations, the data processing system 120 may store the user's search query in a database 155 for later processing. In some implementations, the data processing system 120 provides or otherwise conveys the user search query to the query reference module 140 for further processing. In some implementations, the interface module 135 receives content selection criteria information from a content provider 125 and stores this information in a database 155 or otherwise transmits or conveys the information to one or more component of the data processing system 120 for further processing.

In one implementation, the data processing system 120 includes a query reference module 140 designed and constructed to identify entities in a search query. An entity may be a single person, place or thing, and the repository can include millions of entities that each have a unique identifier to distinguish among multiple entities with similar names (e.g., a Jaguar car versus a jaguar animal). The data processing system can access a reference entity and scan arbitrary pieces of text (e.g., text in web pages, text of keywords, text of content, text of advertisements) to identify entities from various sources. One such source may be a manually created taxonomy of entities such as an entity graph of people, places, properties, and things, built by a community of users.

In some implementations, the data processing system 120 obtains a classification of a plurality of entities. An entity may be a single person, place, thing or topic. Each entity has a unique identifier that may distinguish among multiple entities with similar names (e.g., a Jaguar car versus a jaguar animal). A unique identifier ("ID") may be a combination of characters, text, numbers, or symbols. The data processing system may obtain the classification from an internal or third-party database via network 105. In one implementation, the entities may be manually classified by users of a user device 110. In some implementations, users may access the database of entities via network 105. Users may upload at least one entity or upload multiple entities in a bulk upload. Users may classify the uploaded entities, or the upload may include the classification of at least one entity. In some implementations, upon receiving an entity, the data processing system 120 may prompt the user for a classification.

In some implementations, entities may be manually classified by users. Classifications may indicate the manner in which entities are categorized or structured, e.g., ontology. In some implementations, an ontological classification may include attributes, aspects, properties, features, characteristics, or parameters that entities can have. Ontological classifications may also include classes, sets, collections, concepts, or types. An ontology of "vehicle" may include: type—ground vehicle, ship, air craft; function—to carry persons, to carry freights; attribute—power, size; component—engine, body; etc. In some implementations, the manual classification includes structured data that provides a manually created taxonomy of entities. In some implementations, entities may be associated with an entity type, such as people, places, books, or films. In some implementations, entity types may include additional properties, such as date of birth for a person or latitude and longitude for a location. Entities may also be associated with domains, such as a collection of types that share a namespace, which includes a directory of uniquely named objects (e.g., domain names on the internet, paths in a uniform resource locator, or directors in a computer file system). Entities may also include metadata that describes properties (or paths formed through the use of multiple properties) in terms of general relationships.

The data processing system 120 or a user of user device 110 may classify an entity based on a domain, type, and property. In some implementations, a domain may be American football and have an ID "/american_football". This domain may be associated with a head coach type with ID "/American_football/football_coach". This type may include a property for current team head coached with ID "/American_football/football_coach/current_team_head_coached". Each domain, type, property or other category may include a description. In an illustrative implementations, "/American_football/football_coach" may include the following description: "'Football Coach' refers to coaches of the American sport Football." In some implementations, the data processing system 120 can scan text or other data of a document and automatically determine a classification. The data processing system 120 may scan information resources via network 105 for information about football coaches, and classify that information as "/American_football/football_coach". The data processing system 120 may further assign the entity football coach a unique identifier that indicates a classification.

Entities may be classified, at least in part, by one or more humans ("entity contributors"). This may be referred to as manual classification. In some implementations, entities may be classified using crowd sourcing processes. Crowd sourcing may occur online or offline and may refer to a process that involves outsourcing tasks to a defined group of people, distributed group of people, or undefined group of people. Users may add, modify, or delete classifications online. An illustrative implementation of offline crowd sourcing may include assigning the task of uploading or classifying entities to an undefined public not using the network 105, e.g., to students in a classroom or passersby on the street or at a mall.

In some implementations, data processing system 120 may obtain or gain access to the classification of a plurality entities from content repository 155 (e.g., a database) or another database accessible via network 105. In some implementations, entities may be stored in a graph database where the entity data structure includes as a set of nodes and a set of links that establish relationships between the nodes. The entity data structure in the graph database may be non-hierarchical, which may facilitate modeling complex relationships between individual elements, and allow entity contributors to enter new objects and relationships into the underlying graph structure.

In some implementations, the data processing system 120 identifies an entity of a search query provided by a user device 110 (e.g., input into a search engine). The data processing system 120 includes a query reference module 140 that determines an entity of the search query. The query reference module may identify zero, one or many entities in or associated with the search query. The data processing system may map terms, keywords, or phrases in the search query to one or more well defined entities in a database. The data processing system 120 may score the entities based on the relations among entities in the database and select the entities with the highest weight as page entities. The data processing system 120 may further assign a confidence score to the entity, and select, for further processing, the entity with the highest confidence score. The confidence score may reflect the likelihood that the identified entity in the database semantically matches the search query.

In some implementations, the query reference module 140 may identify multiple interpretations of the search query, where each interpretation includes one or more entities and an individual confidence score within that interpretation. In an illustrative implementation, a search query "flight from springfield to paris" may have multiple interpretations because there are multiple cities or towns named "Springfield". Thus, each interpretation of "Springfield" might have its own unique entity identifier for a specific "Springfield" instance, while the unique entity identifier for "Paris" may remain the same. In some implementations, upon identifying multiple interpretations of the search query, where at least two of the interpretations include at least one entity, the data processing system 120 may filter, select or otherwise identify interpretations or entities to use based on the confidence score of the entity. The data processing system may identify entities of interpretations that exceed a threshold. In some implementations, the data processing system 120 may determine an average confidence score for an interpretation, a weighted average of confidence score, or otherwise determine a confidence score, accuracy or quality for the overall interpretation in order to select an interpretation for content selection.

The identified entities can include additional information about the classification (e.g., metadata). In some implementations, the additional information may include a domain, type, property, or description. In some implementation, the entity includes a unique identifier that indicates a classification of the entity. The additional information may be inferred via the unique identifier of the entity. In an illustrative implementation, an entity may be French, with a unique identifier "/dining/cuisine". The unique identifier "/dining/cuisine" may include properties such as description, region of origin, restaurants, ingredients, dishes, or chefs.

The data processing system 120 may obtain some or all of the additional information associated with the entity and annotate, decorate or otherwise associate that information with the entity. The additional information may be linked to the entity, where the link includes a relationship. In an illustrative implementation, if the entity is an film, the data processing system 120 can annotate the entity with the following properties: produced by, business/product_line/category, written by, genre, featured film locations, production companies, film country, etc.

In some implementations, the data processing system 120 only annotates the entity with commercially relevant information. In an illustrative implementation, the data processing system 120 may access a data structure having a subset of the entire entity graph that is predetermined to be commercially relevant. The predetermined subset may be generated or uploaded by one or more of an administrator of the data processing system 120, content provider 125, user device 110, via crowd sourcing techniques, etc. In some implementations, commercially relevant information may include information for which a content provider may want to provide content items (e.g., advertisements). In some implementations, commercial relevant may refer to content selection goals of the content provider 125. In an illustrative implementation, an entity property /film/film/directedby may be commercially relevant (or valuable) to a content provider 125 whose goal is to select content items based on films by specific directors.

Figure 2:
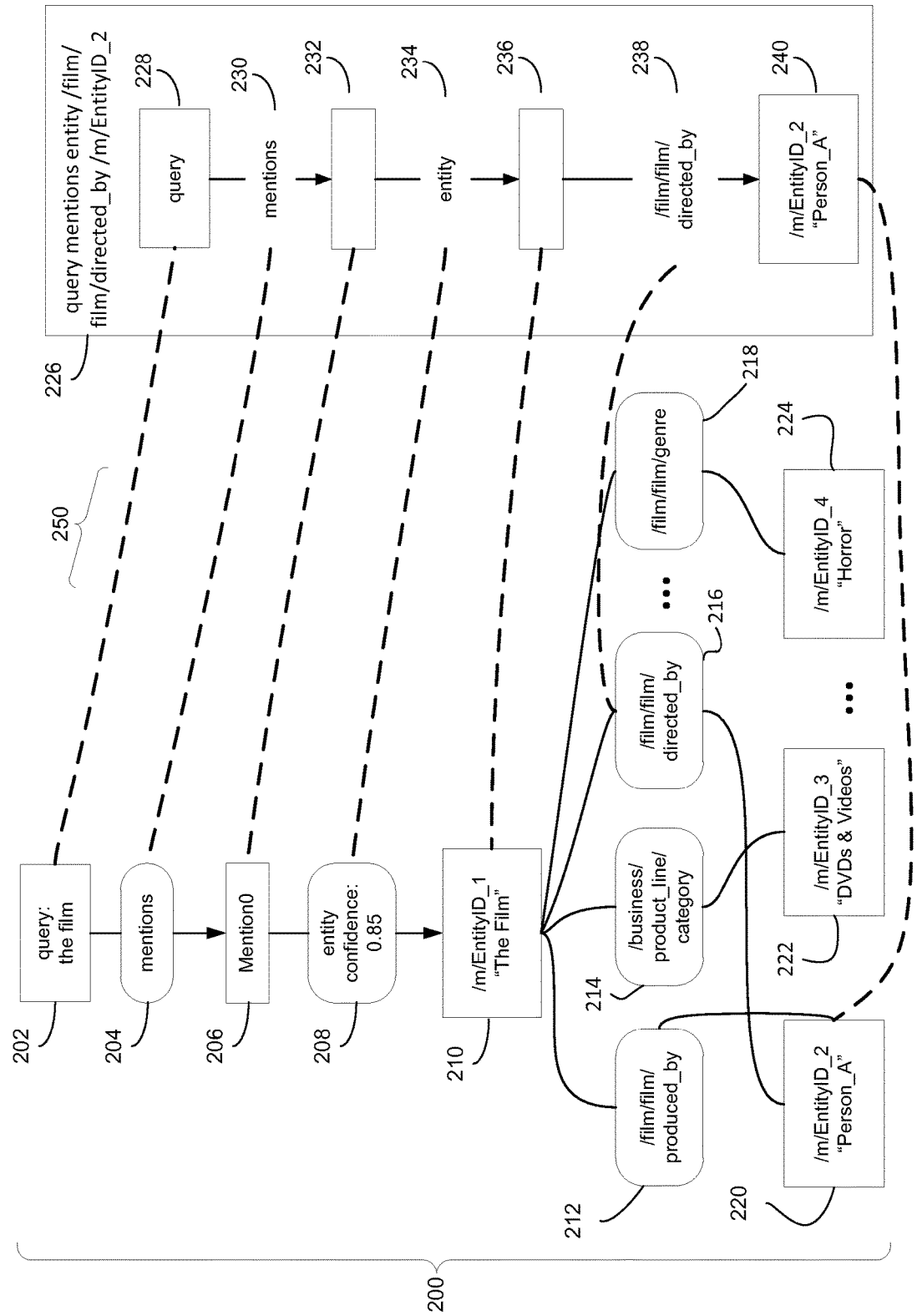
FIG. 2 is an illustration of one implementation of selecting content using entity properties.

In one implementation, the data processing system 120 includes a matching module 145 designed and constructed to identify and determine whether the search query satisfies content selection criteria provided by a content provider in order to select content item of the content provider. The matching module 145 can retrieve, receive, obtain or otherwise identify one or more content selection criteria graphs for a content item, content group, or content campaign of one or more content providers. The content selection criteria graph includes a linked node. In some implementations, the content selection criteria graphs refers to identifying an entity and properties associated with that entity (e.g., an entity X is related to entity Y via the relation Z). In an illustrative implementation, as shown in FIG. 2, the content selection criteria graph 226 may include a content selection query provided by a content provider, which is linked to an entity, which is linked to a property, which has a value. In the search query graph 200 depicted in FIG. 2, an entity may include "The Film" and a property of the entity may include "produced_by" entity "Person_A". The entity "The Film" is related to entity "Person_A" via relationship "produced_by". In some implementations, a property of the entity includes a second entity and a relation between the entity and the second entity.

The data processing system 120 identifies a matching content selection criteria graph (e.g., properties associated with an entity of a content selection criteria). In some implementations, to identify the matching graph or properties, the data processing system 120 (e.g., via a search module), may further process the search query graph or properties generated or identified by the query reference module 140 to create flat data structure (or list) of all the information in the search query graph. In some implementations, the data processing system 120 may translate the search query graph into the flat data structure or list form, which includes some or all of the facts in the search query. In an illustrative implementation, a search query may include "New York City", and the flat data structure or list may include the following information or entries: "query mentions New York City"; "query mentions a place within New York Sate"; "query mentions a city"; "query mentions a place in United States", etc. As this is a flat data structure or list, it may not include all of the relationships or links included in the search query graph. In some implementations, the data processing system can employ distributed computing on clusters of computers using libraries or programming for processing large data sets.

Using this list, the data processing system 120 (e.g., via a search module) can parse, search or otherwise access a database having content selection criteria provided by multiple content providers to identify matching content selection criteria. The data processing system 120 can use various techniques to identify the content selection criteria. In some implementations, the data processing system 120 uses an ordered tree data structure that stores a dynamic set or associated array, such as a trie, radix tree, prefix tree, etc. In some implementations, the search module includes an API configured to register the list of facts (e.g., a query format) to match against documents having the content selection criteria. For every search criteria document presented, the search module can return an identifier for the search criteria of all of the matching queries. In some implementations, the search module may handle a potentially large number of matched queries using queue.

The data processing system 120 may identify multiple content selection criteria that could potentially match the search query graph. In some implementations, the search query graph refers to properties of an entity of a search query. Since the data processing system 120 retrieves the potentially matching content selection criteria using the flat data structure or list, which is the translated search query graph, the data processing system 120 may then determine, one a node-by-node basis, whether the retrieved content selection criteria matches the user search query. That is, because the flat data structure may not include the relationship links between each listed fact (e.g., which is conveyed via the topology of the search query graph), the data processing system 120 (e.g., via the matching module 145), may further compare the retrieved content selection criteria graphs with the search query graph to determine whether the search query satisfy a content selection criteria of a content provider. In some implementations, the matching module 145 may compare the structure, topology, properties, predicates, relationship, links or other aspects of the search query graph and the content selection criteria graph to identify a match.

In some implementations, the data processing system 120 matches the content selection criteria graph with the search query graph by mapping the content selection criteria graph onto the search query graph. In some implementations, the data processing system 120 matches a property of an entity of a content selection criteria with a property of an entity of a search query. In some implementations, a property of the entity includes a second entity and a relation between the entity and the second entity. The data processing system 120 may determine there is a one-to-one correspondence between the content selection criteria graph and the search query graph, or that the content selection criteria graph otherwise fits onto, maps to, or matches the search query graph.

In some implementations, the data processing system 120 employs a step-through process to identify whether the content selection criteria matches the user search query. The data processing system 120 may step through each node and link in the content selection criteria graph to determine whether the search query graph includes the corresponding node or link. If the search query graph does not include the corresponding node or link, the data processing system 120 may determine that the content selection criteria graph does not match, and move on to the next content selection criteria graph and again step-through the links and nodes. In some implementations, the data processing system may compare multiple content selection criteria graphs in parallel (e.g., via distributed computing architecture). Thus, in some implementations, the data processing system 120 matches both the content of the node or link and the topology.

The data processing system 120 may identify zero, one or multiple matching content selection criteria graphs. In an illustrative implementation, the data processing system 120 may identify zero matching content selection criteria graphs (based on topology and content) in the event the flat data structure returned false positives (i.e., graphs with matching content, but without matching topology or sequence).

Upon identifying a content selection criteria graph that matches the sequence of properties, links or nodes of the search query graph, the data processing system 120 (e.g., via a content selector 150) may determine that content items associated with this content selection criteria graph are eligible to be provided to a user device 110 that provided, or is otherwise associated with, the search query. In some implementations, the content selection criteria may be associated with a content campaign (e.g., multiple content groups based on a common theme), a content group (e.g., multiple content items associated with a common landing page), or a content item (e.g., an advertisement, online document, etc.).

FIG. 2 is an illustration of one implementation of selecting content using entity properties. The illustration depicts an implementation of a search query graph 200 and a content selection criteria graph 226. In this illustrative implementation, a data processing system receives a search query "the film" 202. The search query may have been input into a search engine via a user device. The data processing system can determine (e.g., via a query reference module) that the search query 202 mentions 204 one entity 206 (e.g., Mention0). The data processing system further determines that Mention0 206 (which is an entity with a unique entity ID), has a confidence score of 0.85 (208). The data processing system identifies the entity with a unique entity identifier EntityID_1 and with the string "The Film" (210). The string "The Film" is one way of rendering the EntityID_1, but it can be rendered in various ways such as different languages, fonts, sizes, symbols, audio, video, multimedia, etc. In some implementations, the data processing system may not render the entity ID in order to select content. In some implementations, the data processing system may render a human interpretable format upon request or when generating a report.

In some implementations, the entity 210, relation 212, and entity 220 may be referred to as a triple comprising a subject, predicate, and object, respectively. The data processing system can further annotate, decorate, or otherwise associate the entity 210 with additional information, such as the following properties: /film/film/produced_by (212) /m/EntityID_2 "Person_A" (220); /business/product_line/category (214) /m/EntityID_3 "DVDs & Videos" (222); /film/film/directed_by (216) /m/EntityID_2 "Person_A" (220), and film/film/genre (218) /m/EntityID_4 "Horror" (224). These relations 212-218 may be referred to as predicates. The properties may be represented in various ways including, e.g., via unique identifier, different languages, symbols, characters, colors, strings, different structures, etc. The properties may also include various granularity. In some implementations, the granularity may include "directed_by" while in other implementations the granularity includes "/film/film/directed_by". In some implementations, the identified relations may represent a subset of all available relations for an entity. In some implementations, this subset may correspond to commercially relevant properties. Each predicate 212-218 may include, or be linked to, one or more objects 220-224. The objects 220-224 may be an entity and identified by a unique entity identifier. In this illustrative implementation the predicates and objects are linked as follows: /film/film/produced_by 212 is linked to /m/EntityID_2 "Person_A" 220; /business/product_line/category 214 is linked to /m/EntityID_3 "DVDs & Videos" 222; /film/film/directed_by 216 is also linked to /m/EntityID_2 "Person_A" 220; and film/film/genre 218 is linked to /m/EntityID_4 "Horror" 224.

In some implementations, a data processing system identifies, generates, obtains, or accesses search query graph 200 or properties of an entity of a search query. That is, the data processing system determines that the search query "the film" 202 mentions 204 a first entity 206 of EntityID_1 "The Film" 210 with a confidence score of 0.85 (208), and that the EntityID_1 (210) is related to: EntityID_2 "Person_A" (220) via relation "/film/film/produced_by" 212; EntityID_3 "DVDs & Videos" (222) via relation "/business/product_line/category" 214; and EntityID_4 "Horror" (224) via relation "/film/film/genre" 218.

In addition to the search query graph 200 based off the search query "the film" 202, the data processing system identifies one or more candidate content selection criteria graphs 226 that may match the search query graph for the search query 202. The content selection criteria graph 226 is based off of a content selection criteria 228 that is provided by a content provider. In this illustrative implementation, the topology is as follows: query 228, mentions 230, single mention 232, entity 234, single entity 236, predicate /film/film/directed_by 238, and object /m/EntityID_2 "Person_A" 240.

Upon identifying this content selection criteria graph 226 as a candidate for matching, the data processing system may determine whether the content selection criteria graph 226 (or properties of an entity of content selection criteria) matches the search query graph 200 (or properties of an entity of a search query) for search query 202. The data processing system may determine that the topology and the content matches by performing a node-by-node or step-by-step basis comparison of the two graphs 200 and 226 (e.g., as shown by matching lines 250). In an illustrative implementation, the data processing system determine that the query 228 nodes corresponds to the search query node 202, mentions 230 corresponds to mentions 204, mention0 206 corresponds to the single mention 232, entity confidence score 208 satisfies an entity threshold 234 (e.g., a predetermined entity threshold, a threshold set by the content provider in the content selection criteria, a dynamic threshold adjusted based on performance feedback such as click through rate or conversion rate on content items provided for display), /m/EntityID_1 "The Film" 210 corresponds to entity level 236, predicate /film/film/directed_by 238 matches film/film/directed_by 216, and /m/EntityID_2 "Person_A" 240 matches /m/EntityID_2 "Person_A" 220. Thus, the data processing system may determine that the topology and the content of the content selection criteria graph 226 and the search query graph 200 match.

In some implementations, the threshold may include a quality threshold that is determined using based on machine learning approaches (e.g., logistic regression) or other experimentation. The threshold may represent a balance between accuracy (e.g., quality) of the entity interpretation and the coverage (e.g., number of retrieved content items). In an illustrative implementation, the data processing system (e.g., via a query reference module) may identify multiple interpretations of a search query, where each interpretation includes one or more entities and an individual confidence score within that entity. Some entities may have a high confidence score, while other entities may have a low confidence score. The threshold may act to filter out the entities that are used for content selection based on the confidence score. Thus, by lowering the threshold, more entities may be eligible for use in content selection, which may result in greater coverage (e.g., a given content selection criteria graph may match more user search queries). However, using entities with a lower confidence score may result in less relevant content selection. Thus, if the threshold is too low, then the content items associated with the content selection criteria may be less relevant to the search query.

If the data processing system determines that the sequence of nodes and links of the content selection criteria graph 226 matches that of the query graph based on query 202, the data processing system may determine that content items associated with the content selection criteria graph 226 are eligible for selection. The data processing system may provide these content items to an auction or otherwise determine whether these content items will be provided to the user device that provided the search query the film 202.

Figure 3:
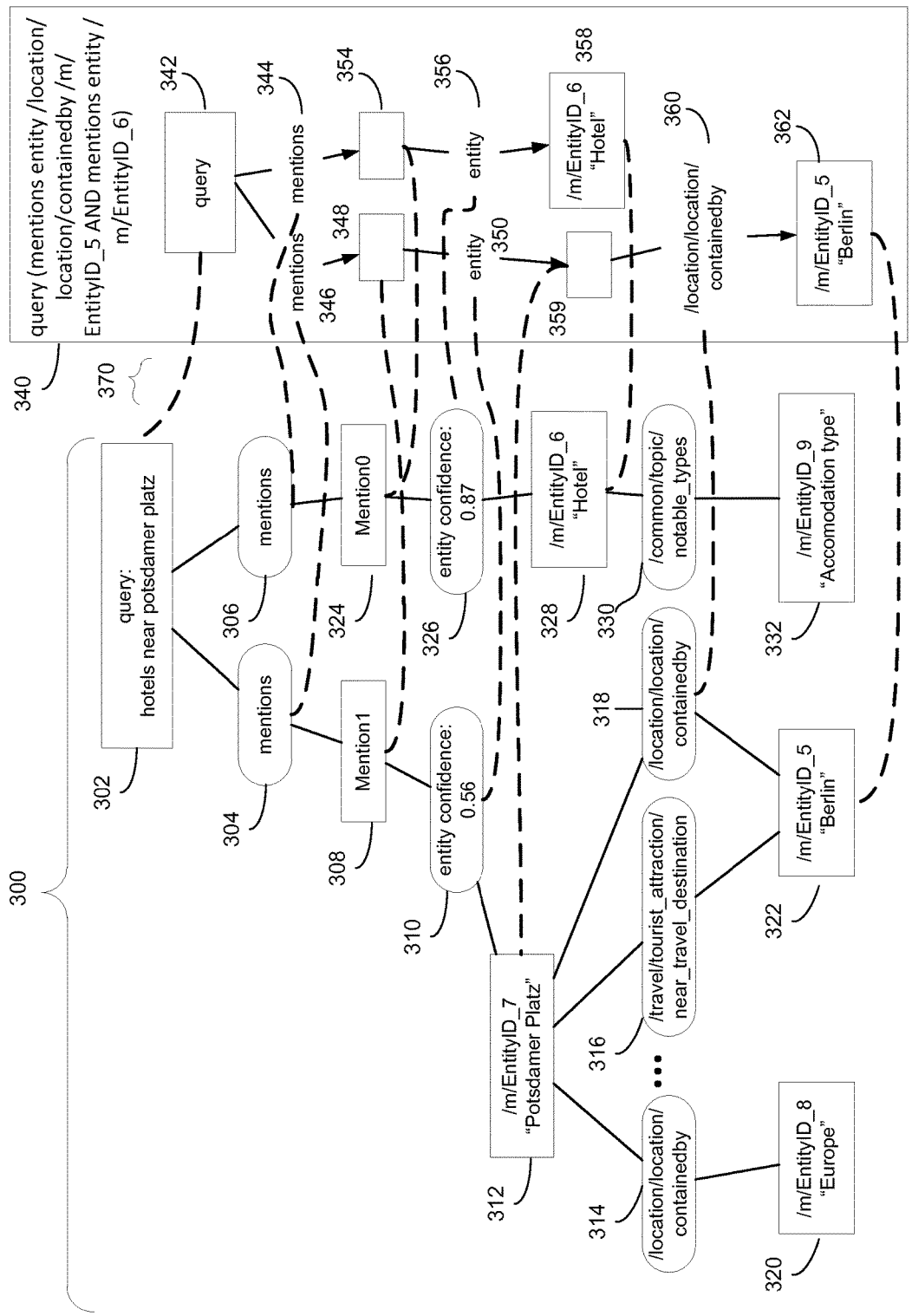
FIG. 3 is an illustration of one implementation of selecting content using entity properties.

FIG. 3 is another illustration of one implementation of selecting content using entity properties. The illustration depicts a search query graph 300 and a content selection criteria graph 340. In this illustrative implementation, the content selection criteria 340 mentions two entities, as opposed to the single entity mentioned in the illustrative implementation of FIG. 2.

The data processing system may receive a search query 302 that includes "hotels near potsdamer platz". The data processing system may determines that this search query has two mentions 304 and 306. Mention 304 may corresponds to Mention1 308. Mention1 may correspond to entity /m/EntityID_7 "Potsdamer Platz" 312 and have a corresponding confidence score 310 of 0.56. The second mention 306 corresponds to Mention0 and corresponds to entity /m/EntityID_6 "Hotel" 328 and corresponds to a confidence score 326 of 0.87.

The data processing system may determine that entity Potsdamer Platz 312 is associated with predicates /location/location/containedby 314, /travel/tourist_attraction/near_travel_destination 316 and/location/location/containedby 318. The data processing system may further identify that each of these predicates 314-318 are associated with objects or entities as follows: /location/location/containedby 314 is linked to object /m/EntityID_8 "Europe" 320; /travel/tourist_attraction/near_travel_destination 316 is linked to /m/EntityID_5 "Berlin" 322; and /location/location/containedby 318 is also linked to object /m/EntityID_5 "Berlin" 322. These predicates and objects may reflect a subset of all available predicates and objects for the entity 312. In some implementations, this subset represents a commercially relevant subset of information for this entity, or another subset that facilitates content selection.

The data processing system may further determine that the second entity, which is /m/EntityID_6 "Hotel" 328, is associated with predicate /common/topic/notable_types 330, which is linked to object /m/EntityID_9 "Accommodation type" 332.

Upon generating, obtaining, or otherwise identifying the search query graph 300 based on query 302, the data processing system may identify one or more potential content selection criteria graphs 340 (e.g., via the flat data structure) and determine a match based on the topology or sequence of nodes and the content on a node-by-node bases. The data processing system steps through levels of the graphs 300 and 340 to determine a match (e.g., as shown by matching lines 370). In this illustration, the data processing system identifies content selection criteria graph 340 as a candidate criteria graph. The criteria provided by the content provider of graph 340 is "query (mentions entity /location/location/containedby /m/EntityID_5 "Berlin" AND mentions entity /m/EntityID_6 "Hotel").

In this illustrative implementation, the first level query 342 corresponds to search query 302. The second level of the content selection criteria graph 340 includes two mentions 344 and 346, which corresponds to mentions 306 and 304, respectively. The third level includes the links between the mentions and the entity, and blocks 354 and 348 correspond to Mention0 324 and Mention1 308, respectively. The fourth level includes the entities 356 and 350, which corresponds to the entity confidence scores of 0.87 (326) and 0.56 (310), respectively. The content selection criteria graph 340 may include an entity threshold value and the data processing system may determine a match if the confidence score of the entity satisfies the threshold (e.g., equals or exceeds the threshold, etc.). The confidence score may represent the semantic relevancy of the entity to the search query. The confidence score may be based on other terms in the search query, browsing history data, or other information that facilitates determining a semantic relevancy of the entity to the search query.

The fifth level of the content selection criteria graph 340 includes /m/Entity ID Hotel 358, which matches the /m/EntityID Hotel 328 of the search query graph 300. The fifth level also includes entity block 359, which matches /mEntityID Potsdamer Platz 312. The sixth level of the content selection criteria graph 340 includes a predicate for the entity 359, which is /location/location/containedby 360. The data processing system may determine that predicate 360 matches predicate 318 of the search query graph 300, which is also /location/location/containedby. Finally, the data processing system, may determine that the object 362 /m/EntityID Berlin matches the object 322. Thus, the data processing system may, by comparing the content selection criteria graph 340 and search query graph 300 on a node-by-node basis, may determine that the topology or sequence of the two graphs 300 and 340 match. Therefore, the data processing system may determine that content items associated with content selection criteria graph 340 are eligible to be selected for display or otherwise provided to the user device that provided the search query 302.

Figure 4:
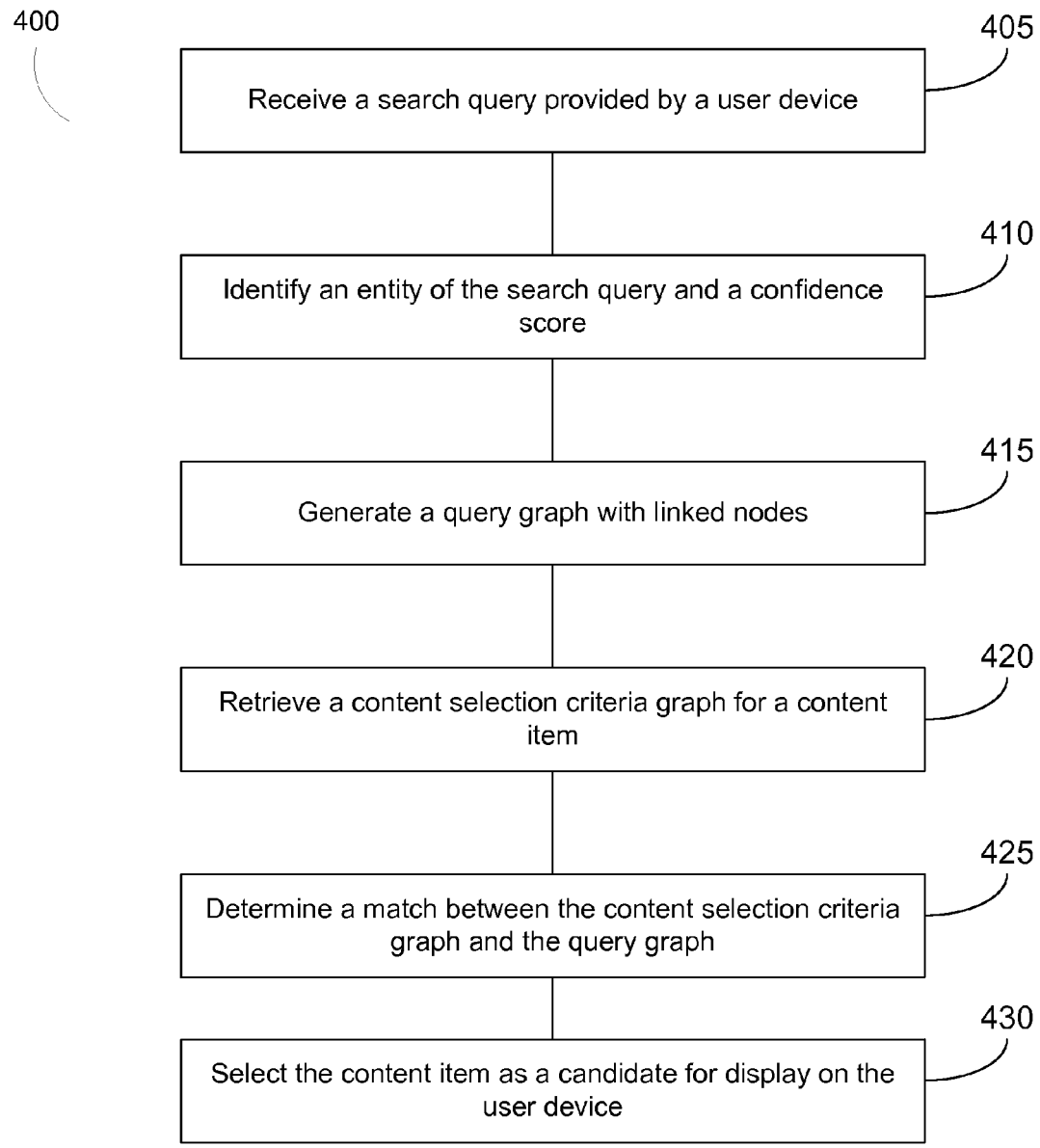
FIG. 4 is an illustration of one implementation of a method of selecting content via a computer network.

FIG. 4 is an illustration of one implementation of a method 400 of selecting content via a computer network. The method 400 can be performed via system 100 or any component thereof. In brief overview, at stage 405, the method 400 includes a data processing system receiving a search query provided by a user device. At stage 410, the method 400 includes identifying an entity of the search query and a confidence score. At stage 415, the method 400 includes generating or identifying a query graph with linked nodes (or otherwise identifying properties of an entity of a query). At stage 420, the method 400 includes retrieving or identifying a content selection criteria graph for a content item (or otherwise identifying properties of an entity of a content selection criteria). At step 425, the method 400 includes determining a match between the content selection criteria graph and the query graph. At step 430, the method 400 includes selecting the content item as a candidate for display on the user device.

At stage 405, the method 400 includes a data processing system receiving a search query provided by a user device. In some implementations, the data processing system receives the search query via a network. In some implementations, the search query may include terms, words, phrases, characters, symbols, or audio (e.g., a voice initiated search, conversational search, etc.). In some implementations, a user of a user device provides the search query as an input, such as an input to a search engine, prompt, text box, etc. In some implementations, the search query may be automatically generated based on information associated with the user device, such as sensor input or other contextual based information. In an illustrative implementation, a user device or data processing system may generate a search query based on a location of a user device. In some implementation, the data processing system receives a search query via an application program executing on a user device or a web page.

At stage 410, the method 400 includes identifying an entity of the search query and a confidence score. In some implementation, the method includes a data processing system (e.g., via a query reference module) identifying the entity. The method 400 may include accessing a data structure having entity information. The method 400 may include identifying a confidence score for the entity that represents a semantic relevancy of the entity to the search query. In some implementations, the data processing system identifies zero, one or many entities. In some implementations, the data processing system identifies multiple interpretations of a search query, where one or more of the multiple interpretations include one or more entities.

At stage 415, the method 400 includes generating or identifying a query graph with linked nodes. In some implementations, the method 400 includes a data processing system (e.g., via the query reference module) generating the query graph. The query graph may represent a subset of the data structure. The subset may be a commercially relevant subset or other subset that facilitates content selection using entity properties. In some implementations, the search query may include multiple entities, in which case the query graph will include multiple entities and corresponding links (e.g., subject, predicate, object triples for each entity).

At stage 420, the method 400 includes retrieving or identifying one or more content selection criteria graph for a content item that could potential match the search query graph. The content selection criteria graph may be provided by a content provider and may be associated with one or more content items. The content selection criteria graph may include one or more linked nodes.

The method 400 may include using a search infrastructure or module to identify the potentially matching content selection criteria graphs. In some implementations, the method 400 includes translating the search query graph into a flat data structure or list that includes the objects of the search query graph, and retrieving some or all content selection criteria graphs that include the objects. Since the list of objects may not include its corresponding topology in the search query, the identified candidate content selection criteria graphs may or may not ultimately match.

At step 425, the method 400 includes determining a match between the content selection criteria graph and the query graph. The method 400 include a data processing system (e.g., via a matching module) determining the match. The method 400 may include stepping through each node of the content selection criteria graph to determine whether it matches a corresponding node of the contents selection criteria graph. That is, the method 400 may include comparing the content selection criteria graph with the search query graph on a node-by-node basis to determine whether the sequences or topologies match.

In some implementations, the method 400 includes determining whether the confidence score exceeds a threshold, which may be predetermined, set by a content provider in the content selection criteria graph, or dynamically adjusted based on performance feedback.

At step 430, the method 400 includes selecting the content item as a candidate for display on the user device. The method 400 may include a data processing system providing a content item, content group, content campaign, or identifiers of same, to a content selector. These content items may enter an online content item auction which may determine, based on additional factors such as bids submitted by content providers, whether the content item will ultimately be provided to a user device for presentation.

Figure 5:
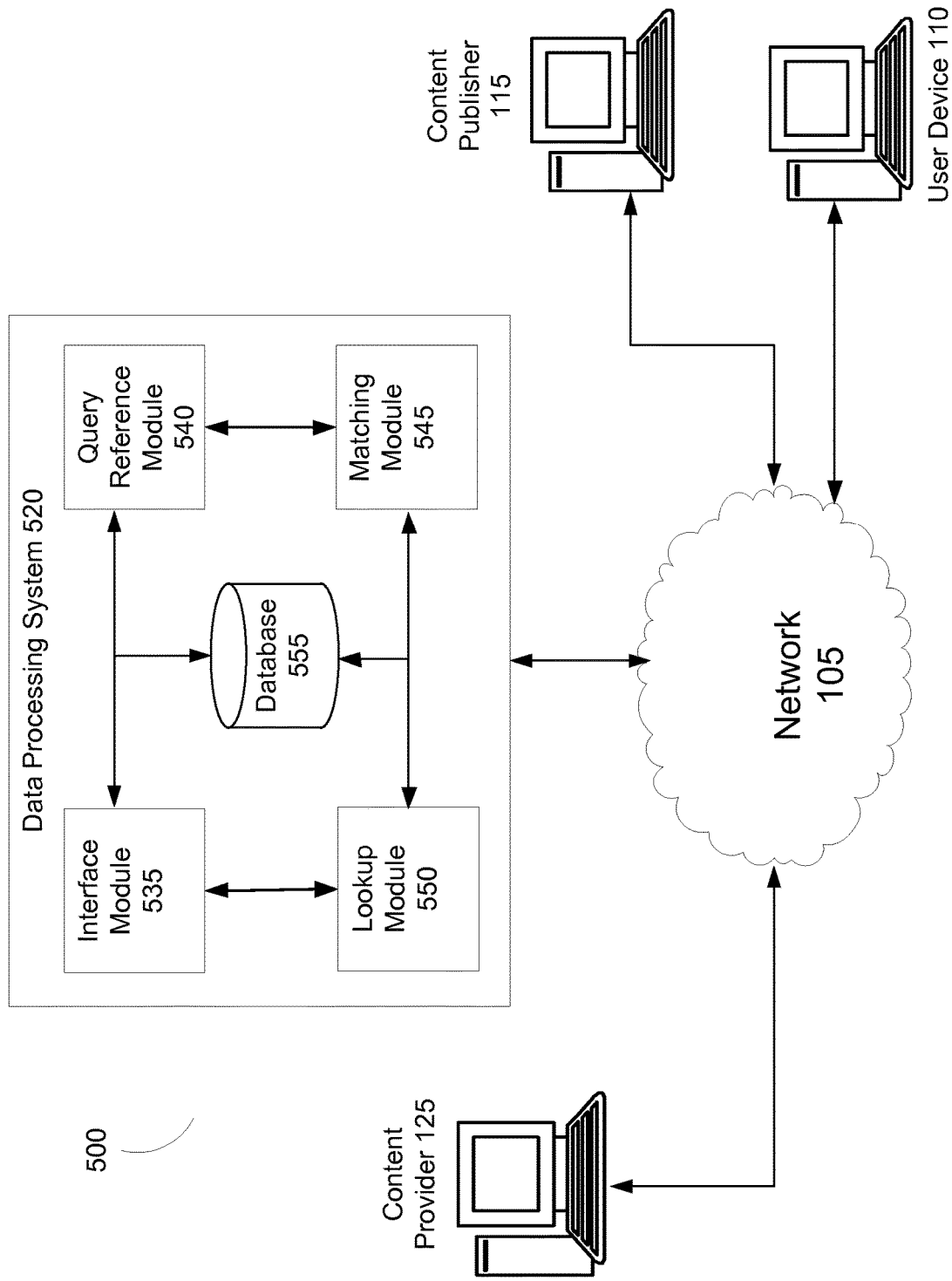
FIG. 5 is an illustration of one implementation of a system for selecting content via a computer network.

FIG. 5 illustrates one implementation of a system 500 for selecting content via a computer network such as network 105. The system 500 and its components, such as a data processing system 520, may include hardware elements, such as one or more processors, logic devices, or circuits. In some implementations, system 500 may include one or components of system 100, or otherwise be designed, constructed or configured to include one or more functionality of system 100. In some implementations, system 500 and system 100 may be the same system. In some implementations, system 100 includes one or more component or functionality of system 500.

The system 500 can include at least one data processing system 520. The data processing system 520 can include at least one logic device such as a computing device having a processor to communicate via the network 105 with the user device 110, the content publisher 115, and at least one content provider 125. The data processing system 520 can include one or more components of data processing system 120, or otherwise be designed, constructed or configured to include one or more functionality of system 100. In some implementations, data processing system 520 and data processing system 120 may include the same components, be configured the same, or be the same data processing system. In some implementations, data processing system 120 includes one or more component or functionality of system 520.

The data processing system 520 can include at least one an interface module 535, at least one query reference module 540, at least one matching module 545, at least one lookup module 550, and at least one database 555. The at least one an interface module 535, at least one query reference module 540, at least one matching module 545, and at least one lookup module 550 can each include at least one processing unit or other logic device such as programmable logic array engine, or module configured to communicate with the database 555. The at least one interface module 535, at least one query reference module 540, at least one matching module 545, and at least lookup module 550 can include a single component, or part of the data processing system 520 or data processing system 120. In some implementations, the interface module 535 and interface module 135

In some implementations, interface module 535 may include one or components of interface module 135, or otherwise be designed, constructed or configured to include one or more functionality of interface module 135. In some implementations, interface module 535 and interface module 135 may be the same interface module. In some implementations, interface module 135 includes one or more component or functionality of interface module 535.

In some implementations, the data processing system 520 or interface module 535 is configured to receives an indication to generate content selection criteria based on target content. The interface module 535 may receive the target content. Receiving the target content may serve as the indication to generate content selection criteria. In some implementations, the data processing system 520 receives an indication to generate content selection criteria and then provides a prompt to enter additional information that can be used to generate the content selection criteria, such as the target content. In some implementations, the target content includes a query or a set of queries. In some implementations, the target content includes an online document such as a web page. In some implementations, the target content includes a link, URL, or address of a web page or a data file that includes text, terms, keywords, or queries. The target content can refer to content that a content provider is targeting. In an illustrative implementation, a content provider may target a list of books such that an advertisement of the content provider is provided responsive to the data processing system 520 receiving a search query for a book associated with the list of book (e.g., by an author of the list of books).

In some implementations, the interface module 535 may provide a graphical user interface to a content provider 125 configured to facilitate establishing, creating or modifying a content selection campaign or aspect thereof. In some implementations, a content provider 125 may add or select content items and content selection criteria to facilitate content selection and providing content items for display or other presentation via a user device 110.

Figure 6:
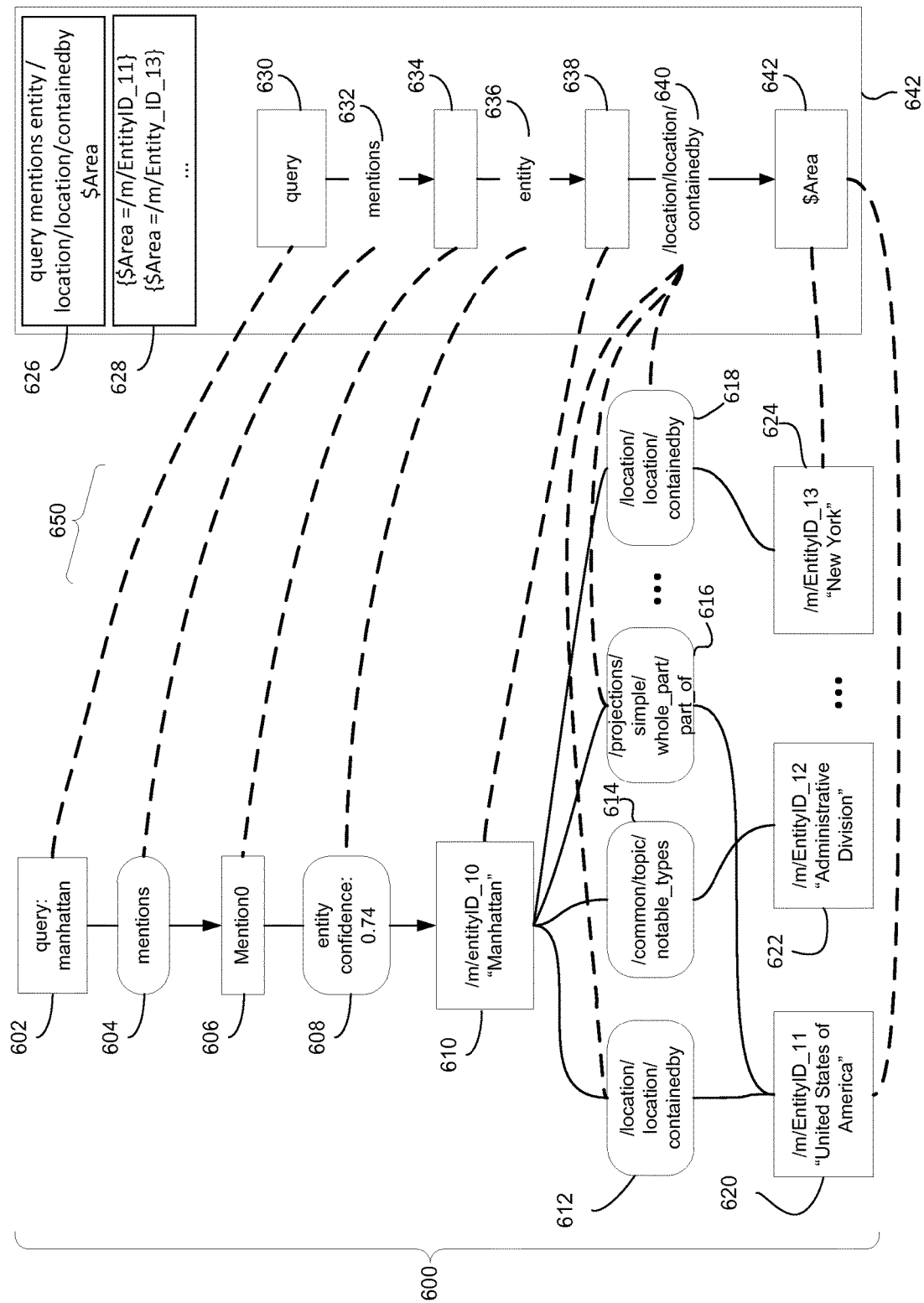
FIG. 6 is an illustration of one implementation of creating content selection criteria using entity properties.

In some implementations, the target content includes a query or sets of queries which are used to create content selection criteria. In an illustrative implementation, as shown in FIG. 6, the target content may include a string such as "manhattan". In other illustrations, the target content may include a web page (e.g., a link, address, URL or other identifier of a web page), online document, data file, product information, or other data that can be processed by the data processing system 520 to identify one or more entities and create content selection criteria.

The data processing system 520 can include a query reference module 540. In some implementations, query reference module 540 may include one or components of query reference module 140, or otherwise be designed, constructed or configured to include one or more functionality of query reference module 140. In some implementations, query reference module 540 and query reference module 140 may be the same query reference module. In some implementations, query reference module 140 includes one or more component or functionality of query reference module 540.

The query reference module 540 can use the target content (e.g., target content including the query or set of queries) provided via the content provider 125 to identify one or more entities of the target content and create, generate or identify a property of the entity. The property of the entity may include or be associated with a category, topology, hierarchical semantic structure, or a query graph. In some implementations, the query reference module 540 identifies information about entities of the query using a data structure storing entity information. In some implementations, query reference module 540 creates, identifies, or uses a query graph or data structure with entity information in a manner similar to query reference module 140. In some implementations, the data processing system 520 receives a list of queries or parses a web page or other electronic document to identify a list of queries. The data processing system 520, using the list of queries, can identify the one or more entities of the one or more queries. In some implementations, the data processing system 520 identifies one or more interpretations of the query, where each interpretation may include zero, one or many entities. In some implementations, the data processing system 520 identifies a confidence score corresponding to the instance of the entity or interpretation.

The query reference module 540, as discussed in relation to query reference module 140, accesses a data structure comprising entity information to annotate or otherwise associate information with the entity. The information may include properties or other relations of the entity. The data processing system 520 can determine that the target content provided by the content provider 125 "mentions an X that is related to EntityID_Y via the relation /A/B/C". In an illustrative implementations, where the target content (or query or set of queries) includes a list of books, the data processing system 520 determines that "the target content mentions a book that is related to Person_X via the relation /book/author/works_written".

In some implementations, the data processing system 520 includes a lookup module 550 designed and constructed to identify, access or otherwise obtain one or more templates based on the target content provided by the content provider 125. In some implementations, the lookup module 550 can parse a data structure stored in a memory (e.g., database 555) to identify one or more templates.

The data processing system 520 can use the template to facilitate identifying or creating content selection criteria based on the target content provided by the content provider 125. The template may include a topology and a named variable. A named variable may include a variable that can be named and assigned values. The values may refer to entity identifiers, strings, symbols, etc. Named variable can correspond to types or categories of entities. In an illustrative implementation, named variables may include, e.g., one or more of $Area, $Collection, $Directors, $Genres, etc. Named variables may be based on a query graph or entity data structure.

In an illustrative implementation, if the target content provided by the content provider 125 includes query "manhattan", the query reference module 540 may annotate the query with a property or relation such as "location/location/containedby". In some implementations, a property of the entity includes a second entity and a relation between the entity and the second entity. Based on this relation, the lookup module 550 can identify one or more templates that include a topology (e.g., "query mentions entity /location/location/containedby") and a named variable (e.g., $Area). In another illustrative implementation, the query provided by the content provider 125 may be "Eiffel tower". The data processing system 520 may annotate the query with one or relations or properties such as "/location/location/containedby" and "in_collection". Based on these relation types, the data processing system may identify a template "query mentions entity (in_collection $Collection AND /location/location/containedby $Area)" that includes two named variables $Collection and $Area.

In some implementations, the data processing system 520 identifies a template that corresponds to some or all the relations associated with one or more entity of the query provided by the content provider 125. In some implementations, the data processing system 520 identifies a template for one or more interpretations of the query identified by the query reference module 540. In some implementations, the templates may correspond to commercially relevant relations or properties of the one or more entities of the query. In an illustrative implementation, the content provider 125 may indicate, or the data processing system 520 may otherwise determine (e.g., based on predetermined information or historical analysis) that using one or more types of named variables (e.g., $Area or $Collection) to create content selection criteria may result in effective content selection (e.g., improved performance based on click through rate or conversion rate).

In some implementations, an administrator of the data processing system 520 may generate or store templates in a database that can be accessed or used by the data processing system 520 to create content selection criteria. The stored templates may include templates for one or more relations and named variables. In some implementations, the database may store a list of commercially relevant named variables and relations, and combine them or otherwise use them to form a template in real-time (e.g., upon receiving a request to generate content selection criteria using a query provided by a content provider). In an illustrative implementation, the database may include a relation /location/containedby and a named variable $Area associated with that relation. The database may also include a relation /in/_collection and a named variable $Collection associated with that relation. The data processing system 520, upon identifying information of an entity associated with a query, may combine the two relations and named variables to form a template that includes both relations and named variables.

In some implementation, the data structure stored in database 555 may include, for one or more relations, a corresponding named variable. The relations and named variables may correspond to one or more templates. The one or more templates (or set of templates) stored in a data structure of database 555 (or other memory accessible by data processing system 520) may be dynamically generated, modified, or updated based on a time interval or receiving an instruction to update the set of templates. In some implementations, a content provider 125 may provide a set of templates for use in creating content selection criteria for content items of the content provider 125. In some implementations, a set of templates may correspond to a type of content provider 125, vertical (e.g., automotive, travel, food, sports), market, audience, etc.

In some implementations, the lookup module 550 identifies or determines semantic criteria associated with or corresponding to a named variable. In an illustrative implementation, a named variable $Area may correspond to, include, or otherwise be associated with or linked to instances of the named variable (which may include entities or unique entity identifiers) such as "United States", "California", "New York City", "Suffolk County", etc. The lookup module 550 may identify the associated instances via parsing or otherwise analyzing a data structure providing structured and detailed information about persons, places or things associated with unique entity identifiers. In an illustrative implementation, the entity "United States" may include a property "/location" in the data structure, and the data processing system 520 may determine, based on the property "/location", that "United States" corresponds to named variable $Area. A semantic criteria may include the topology identified in the template with an instance of one or more named variable.

In some implementations, the data processing system 520 identifies semantic criteria that corresponds to annotated information of an entity of a search query provided by a content provider. In an illustrative implementation shown in FIG. 6, the query "manhattan" (602) mentions (604) entiyID_10 "Manhattan" (610), which is related to entityID_11 "United States of America" (620) via relation "location/ location/containedby" (612). Thus, the data processing system 520 may identify semantic criteria 628 that corresponds to the named variable $Area and matches the EntityID_11.

In some implementations, the semantic criteria identified based on the template and the named variables match the query graph because the template and named variables are selected to match the query graph. In an illustrative implementation, a query graph may include topology with entities "query (mentions entity /location/location/containedby /m/EntityID_x AND mentions entity /common/topic/no-table_type /m/EntityID_y)", and a selected template may include topology and named variables "query (mentions entity /location/location/containedby $Area AND mentions entity /common/topic/notable_type $Type)", where at least one instance of named variable $Area matches EntityID_x and at least one instance of named variable $Type matches EntityID_y. Thus, in some implementations, by identifying a template with named variables that matches the query graph, and corresponding instances of the named variables, the semantic criteria based on the template and the instances of the named variables are identified as matching the query graph.

In some implementations, the data processing system 520 includes a matching module 545 designed and constructed to identify or create content selection criteria based on named variables of a template and entities mentioned in target content (or query or set of queries) provided by a content provider 125. In some implementations, the matching module 545 maps the semantic criteria or entities of the named variable (628) to the entities of the query graph (e.g., 620, 622, 624) to determine whether one or more entities of the query graph match an entity of the named variable. In some implementations, it may not be necessary to perform this match because the semantic criteria identified by the lookup module 550 using the template, named variables, and instances of the named variables is guaranteed to match the query graph because the template is already identified as matching the query graph.

In some implementations, upon determining a match, the data processing system 520 may provide, suggest or otherwise indicate that one or more matching entity may be used as content selection criteria. In some implementations, the data processing system 520 may identify the matching entity (e.g., EntityID_11 "United States of America" 620) for use as content selection criteria based on the received query. In some implementations, the data processing system 120 may identify multiple matching semantic criteria and perform further processing or analysis to identify one or more matching semantic criteria for use as content selection criteria by the content provider.

In some implementations, the data processing system 520 identifies a matching semantic criteria on a node-by-node basis by stepping through the nodes and links as illustrated in FIG. 6. In this illustrative implementation, for the named variable $Area 642 to match, the content of the named variable $Area (e.g., the semantic criteria 628) and the topology or sequence (e.g., 630-640) is mapped or compared to the query graph 600 as shown by matching lines 650.

In some implementations, where a template includes multiple named variables, the data processing system may identify a semantic criteria that corresponds to the named variables individually. In some implementations, the data processing system 520 identifies a semantic criteria that corresponds to both of the named variables.

Upon identifying one or more matching semantic criteria 628 (e.g., /m/EntityID_11 and /m/Entity_ID_13), the data processing system 520 may further determine whether one or more of these semantic criteria may be effective in content selection. In some implementations, the data processing system 520 determines a metric indicative of the effectiveness of the semantic criteria in content selection. The metric may quantify how strongly the presence or absence of property A is associated with the presence or absence of property B in a given corpus. In some implementations, the data processing system 520 determines a metric based on a statistical technique such as an odds ratio or a term frequency-inverse document frequency. The data processing system 520 may use the statistical metric to select one or more of the matching semantic criteria to be candidate content selection criteria, and provide or suggest these candidate content selection criteria to a content provider for use in a content selection campaign.

In some implementations, the statistical metric may represent an information content of the matching semantic criteria (e.g., based on a term frequency-inverse document frequency ("tf-idf") where documents correspond to queries). In an illustrative implementation, if a new piece of information is true for 90% of queries, then the new piece of information may not be useful. The tf-idf may include a numerical statistic that reflects how important a word is to a query in a collection or corpus of queries. The tf-idf value may increase (e.g., proportionally) to the number of times a word appears in the corpus of queries, but may be offset by the frequency of the word in the corpus.

In an illustrative implementation, the target content provided by a content provider may include two queries "Eiffel Tower" and "Big Ben". Based on these queries, the data processing system 520 may identify matching semantic criteria "building in Europe" and "building in France". The data processing system 520 may further determine that the first matching semantic criteria matches both queries provided by the content provider 125, while the second matching semantic criteria matches one of the queries provided by the content provider 125. Thus, the term frequency for "building in Europe" may be 2, while the term frequency for "building in France" may be 1. The term frequency may refer to the number of queries provided by the content provider with which the semantic criteria matches.

The data processing system may further incorporate an inverse document frequency factor with the term frequency to determine the statistical metric to facilitate distinguishing between relevant and non-relevant information. In some implementations, inverse document frequency refers to inverse query frequency (e.g., document refers to query). The inverse document frequency may be determined across a large corpus of historical queries. In some implementations, the data processing system 520 may include or have access to a log of historical queries provided by one or more content providers 125, and use that information to determine the inverse document frequency. The inverse document frequency (e.g., inverse query frequency) is a measure of whether the query, term, phrase or semantic criteria is common or rare across a corpus or collection of documents or queries (e.g., historical queries). In some implementations, the data processing system 520 determines the inverse document frequency by dividing the total number of documents (or queries) by the number of documents (or queries) containing the term. In some implementations, the data processing system may further take a logarithm of this quotient.

The data processing system 520 may then determine the odds ratio by taking the product of the term frequency and the inverse document frequency. Further to the illustrative implementation above, the total number of queries in the corpus may be 10, and the number of queries comprising the first semantic criteria may be 5, while the number of queries comprising the second semantic criteria may be 2. Thus, the inverse document frequency for the first semantic criteria may be the logarithm of 10 divided by 5, and the inverse document frequency for the second semantic criteria may be the logarithm of 10 divided by 2. Finally, the tf-idf, or odds ratio, may be the product of the term frequency and the inverse document frequency. The tf-idf for the first semantic criteria may be 2*log(10/5) and the tf-idf may be 1*log(10/2), or 0.6 and 0.7, respectively. The data processing system may use the resulting statistical metric as a weight or score when determining whether to include one or more matching semantic criteria as content selection criteria, or may provide the weight or score to a content provider 125 to facilitate selecting content selection criteria. In some implementations, the data processing system ranks the matching semantic criteria based on the statistical metric.

In some implementations, the data processing system 520 stores the computed statistical metric in a database. In some implementations, the data processing system 520 associates or otherwise assigns or links the statistical metric with a content selection criteria or content campaign. The data processing system 520 may determine the statistical metric, or one or more component thereof, in an offline process, based on a time interval (e.g., periodic, daily, weekly, hourly), or responsive to determine a statistical metric. The data processing system 520 may determine the statistical metric in real-time, such as when a content provider 125 requests additional content selection criteria for a content selection campaign or provides a set of queries.

In some implementations, the data processing system 520 ranks the matching semantic criteria based on the determined statistical metric. The data processing system 520 may provide the highest ranking matching semantic criteria (e.g., top 3, top 5, top 10, etc.) as a suggestion for candidate content selection criteria (e.g., the content provider may select one or more of the suggested candidate content selection criteria for inclusion or use in a content selection campaign).

In some implementations, the data processing system 520 determines whether a statistical metric of a matching semantic criteria satisfies a threshold (e.g., meets or exceeds an odds ratio threshold). The threshold may be predetermined by an administrator of the data processing system 520, or provided by a content provider 125. In some implementations, the threshold may be a dynamic threshold that is determined based on performance feedback (e.g., click through rate or conversion rate of content selection criteria and their corresponding odds ratio) in order to improve the effectiveness of a content selection campaign. In some implementations, the data processing system 520 may use a logistic regression model or other machine learning technique to determine a threshold based on performance feedback.

In some implementations, upon identifying multiple named variables and semantic criteria for the named variables, the data processing system 520 may form a set of combinations of the semantic criteria and further determine a candidate content selection criteria by taking a Cartesian product of the sets (e.g., a Cartesian product of the statistical metric of the individual semantic criteria or instances of the named variable). In an illustrative implementation, the query received by a content provider may be "eiffel tower". The data processing system may identify a template that includes a named variable for area and named variable for collection as follows: "query mentions entity (in_collection $Collection AND /location/location/containedby $Area)". The data processing system 520 may identify three matching semantic criteria for the named variable $Collection (e.g., "towers", "buildings", and "tourist_attractions") and three different matching criteria for the named variable $Area (e.g., "France", "Paris", and "Champ de Mars"). The data processing system 520 may further identify a statistical metric (e.g., an odds ratio or tf-idf) for each of the six matching semantic criteria. Thereafter, in order to identify, select or suggest a candidate content selection criteria based on the template, the data processing system 520 may identify all combinations of the three collection-related semantic criteria with the three area-related semantic criteria and determine a statistical metric for each combination (e.g., by multiplying the individual statistical metrics, taking an average of the individual statistical metrics, summing the individual statistical metrics or otherwise manipulating the individual statistical metrics to determine a combined statistical metric). In some implementations, the data processing system 520 may use a Cartesian product of these two sets to determine a statistical metric for each combination. The data processing system 520 may then identify a content selection criteria based on the combined odds ratios. In an illustrative implementations, the data processing system 520 may identify the following candidate content selection criteria: "search queries that mention towers in Paris". Thus, the data processing system 520 may identify content selection criteria for templates with multiple named variables using Cartesian product of the statistical metric of the matching semantic criteria.

In some implementations, a content provider, upon receiving one or more candidate content selection criteria, may select some or all of the candidate content selection criteria. In some implementations, the select content selection criteria may be affirmative content selection criteria or negative content selection criteria. Affirmative content selection criteria may refer to selecting content items when a request for a content item is associated with the content selection criteria (e.g., an advertisement for a Mexican restaurant responsive to a use search query that mentions Mexican food). In some implementations, the content selection criteria may be used as negative content selection criteria such that content items of the content provider is blocked, prevented, prohibited, determined ineligible, or otherwise not selected when a request for a content item is associated with the negative criteria (e.g., block the advertisement for the Mexican restaurant from being provided responsive to a search query that mentions fast food).

In some implementations, the data processing system 520 provides a natural language description of the matching semantic criteria. The data processing system 520 can provide the natural language description based on properties of an entity, a query graph, template, and a display name of an entity corresponding to an instance of a named variable of the template. The data processing system 520 may provide, transmit or otherwise present the natural language description or rendering of the template to the content provider via the network.

In some implementations of providing a natural language description, the template may include "query mentions entity /film/film/directedby $Director" and a natural language template may include "Query mentions a movie directed by {Director}". In some implementations, the data processing system may account for grammatical structure in generating the natural language version of the template. In an illustrative implementation, the query may include "Alien", and the data processing system may provide, in natural language, the following: "Query mentions a movie directed by Ridley Scott".

In some implementations, the data processing system 520 determines an estimated traffic flow for the candidate content selection criteria. The data processing system 520 may determine the estimated traffic flow based on a log that includes historical queries that resulted in traffic being directed to a web page or domain. In an illustrative implementation, the data processing system 520 may parse a log of web page visits and identify all visits that resulted from a query corresponding to the candidate content selection criteria, and further determine that the candidate content selection criteria resulted in 1000 web page views for a content provider over a time interval (e.g., a day, week, month, etc.).

FIG. 6 is an illustration of one implementation of creating content selection criteria using entity properties. A data processing system may receive an indication of a target content such as the query "manhattan" (602) from a content provider (e.g., via a user interface, input text box, parsing a landing page, or other online document) and identify, generate, create or otherwise use a query graph 600. A query graph may refer to a categorical or hierarchical structure of information associated with entities, such as properties of the entity. The query graph may further include relations between entities. The data processing system may identify a template 626 with a named variable and identify matching semantic criteria 628 based on matching content and topology.

To generate or identify the properties of the entity or query graph 600, the data processing system may determine that the query 602 (e.g., target content) mentions 604 a first entity 606. The first entity may be identified as an entity with a unique identifier /m/entityID_10, which may be rendered as a string "Manhattan". The data processing system may determine an entity confidence score of 0.74 for entity 610. The data processing system may further determine that the query 602 mentions 604 entityID_10 which is related to 620, 622 and 624 via relations 612, 614, 616 and 618. That is, the data processing system determines that the query "manhattan" (602) mentions (604) a first entity (606) of entityID_10 (610) with a confidence score (608), and the entityID_10 (610) is related to: EntityID_11 "United States of America" (620) via the relation "/location/location/containedby" (612) and the relation "/projections/simple/whole_part/part_of" (616); EntityID_12 "Administrative Division" (622) via the relation "/common/topic/notable_types" (614); and EntityID_13 "New York" (624) via the relation "/location/location/containedby" (618).

The data processing system identifies a template 626 based on the received query 602. The template 626 may include "query mentions entity /location/location/containedby $Area". In some implementations, the template may include multiple named variables (e.g., $Area and $Collection). The data processing system may identify semantic criteria that correspond to the named variable. Upon identifying the query graph, template, named variable, and potential semantic criteria, the data processing system may determine whether the semantic criteria match the query graph (e.g., via matching lines 650). The matching semantic criteria 626 may match the query graph based on content and topology. That is, the data processing system may map, compare, or match the sequence or graph 642 that includes query 630 mentions 632 entity 636 relation 640 and content of named variable 642 with the query graph 600 to identify matching semantic criteria 628. In this illustrative implementations, the matching semantic criteria 628 for query manhattan 602, based on content and topology, includes EntityID_11 "United States of America" and entityID_13 "New York" (628). The data processing may select one or more matching semantic criteria 628 as candidate content selection criteria or perform further processing (e.g., using an odds ratio, performance metric, or other quality metric) to identify effective content selection criteria.

Figure 7:
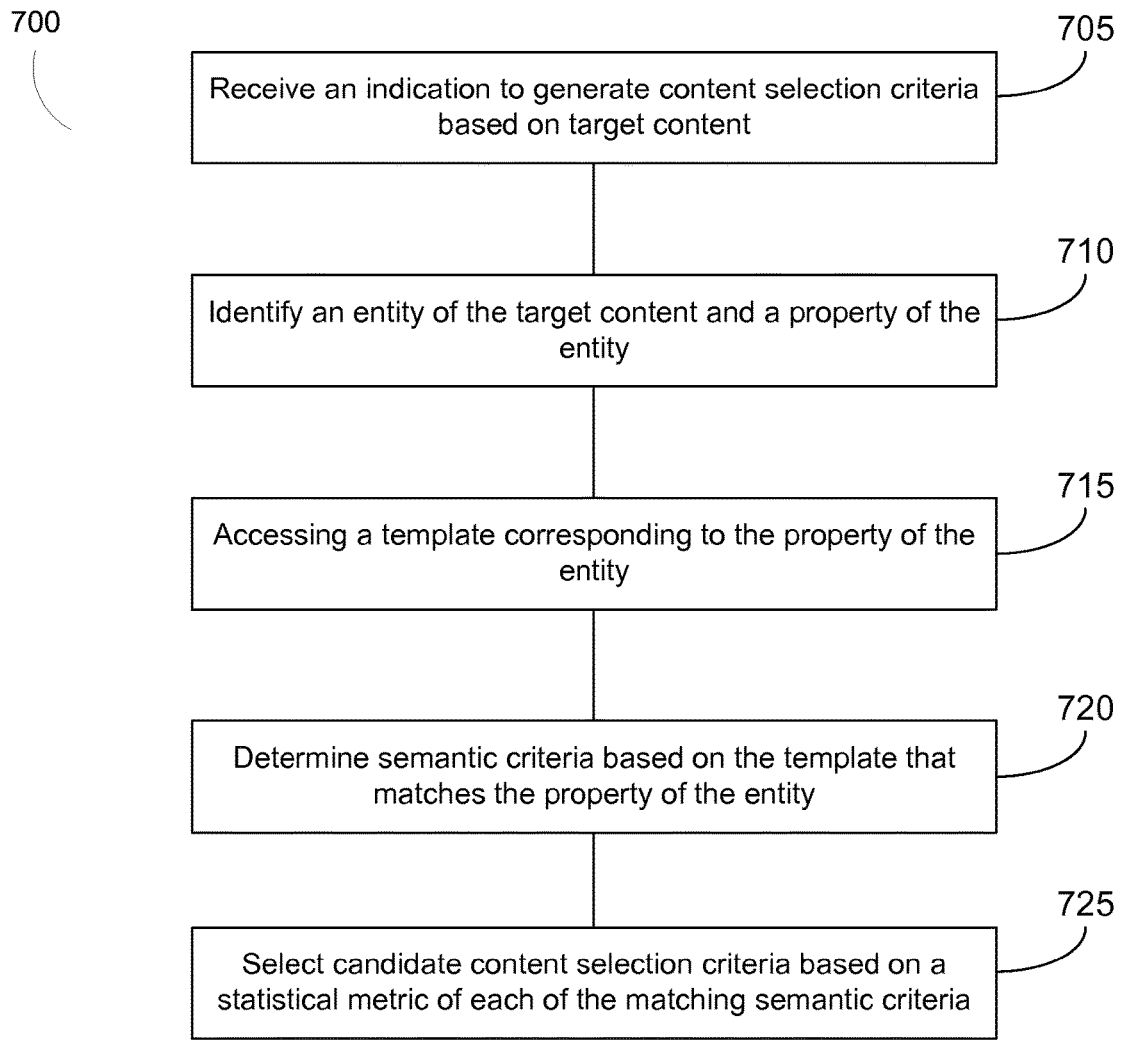
FIG. 7 is an illustration of one implementation of a method of selecting content via a computer network.

FIG. 7 is an illustration of one implementation of a method 700 of selecting content via a computer network. The method 700 includes a data processing system receiving an indication to generate content selection criteria based on target content (705). The method 700 can include identifying an entity of the target content and a property of the entity (710). The method 700 can include accessing a template corresponding to the property of entity (715). The method 700 can include determining semantic criteria based on the template that matches the property of the entity (720). The method 700 can include selecting candidate content selection criteria based on a statistical metric of each of the matching semantic criteria (730).

The method 700 includes a data processing system receiving an indication to generate content selection criteria based on target content (705). In some implementations, the data processing system receives an indication of a query. An indication of a query may be received via a user interface of the data processing from a device of a content provider. The indication of a query may include a string, text, characters, symbols, audio, multimedia etc. The indication of a query may also include an online document, data file, web page, landing web page of a content provider.

In some implementations, the indication of a query may include historical search queries that resulted in traffic directed to a web page of the content provider (e.g., users directed to a landing web page of a content provider). In an illustrative implementations, a data processing system may receive, obtain or store a log that includes search queries that resulted in users being directed to a web page of a content provider. In some implementations, the log may include additional information that may facilitate generating content selection criteria such as information associated with a previously viewed web page or a selected content item. In some implementations, a content provider may provide this information via a batch process to the data processing system.

The method 700 can include identifying an entity of the target content and a property of the entity (710). In some implementations, the method 700 can include identifying an entity of the query to generate a query graph (or otherwise identify properties of an entity of the query). In some implementations, a property of the entity includes a second entity and a relation between the entity and the second entity. A data processing system (e.g., via a query reference module) may identify zero, one or multiple entities of the query. The method 700 may include storing the identified entities in a memory or using the identified entities for further processing.

In some implementations, the method 700 includes determining a confidence score for the identified entity of the query, determining whether the confidence score satisfies a threshold, and obtaining, generating, creating or otherwise identifying a query graph using the entity based on the entity satisfying the threshold.

The method 700 can include accessing a template corresponding to the property of entity (715). In some implementations, where the data processing system identifies multiple entities in the received query, the method 700 may include identifying a template that corresponds to one or more of the multiple entities. In some implementations, the template includes one or more named variables and relations or topologies. In some implementations, the template may include multiple named variable if it is determined that there are multiple commercially relevant relations associated with the entity mentioned in the query received from the content provider.

The method 700 can include determining semantic criteria based on the template that matches the property of the entity (720). In some implementations, the method 700 can include determining semantic criteria based on the template that matches the query graph (or properties of the entity of the query). In some implementations, the method 700 includes determining semantic criteria corresponding to one or more named variables of the template. In some implementations, the semantic criteria may include instances of a named variable of the template. In some implementations, the semantic criteria based on the instances of the one or more named variables of the template match the query graph. The method 700 may include identifying the semantic criteria via a data structure comprising information about entities.

In some implementations, the method 700 can include identifying semantic criteria that match the query graph or properties of the entity of the query. In some implementations, a property of the entity includes a second entity and a relation between the entity and the second entity. The method 700 may include matching the content and the topology of the semantic criteria with the query graph on a node-by-node basis to identifying matching semantic criteria.

The method 700 can include selecting candidate content selection criteria based on a statistical metric of each of the matching semantic criteria (730). In some implementations, the method 700 can include using a statistical metric (e.g., tf-idf or odds ratio) of each of the matching semantic criteria to select candidate content selection criteria. In some implementations, where the template includes multiple named variables, the method may include determining a Cartesian product based on the statistical metrics for semantic criteria corresponding to the multiple named variables. The method 700 may include selecting top ranking matching semantic criteria as candidate content selection criteria, or otherwise selecting some or all of the matching semantic criteria using metrics such as performance metric or quality metric. In some implementations, the statistical metric includes metrics based on click through rate, conversion rate, cost-per-click, performance feedback, etc.

FIG. 8 is a block diagram of a computing system 800 in accordance with an illustrative implementation. The computing system or computing device 800 can be used to implement the system 100 or 500, content provider 125, user device 110, content publisher 115, data processing system 120, at least one interface module 135 and 535, at least one query reference module 140 and 540, at least one matching module and 545, at least content selector 150, at least one lookup module 550, and at least one search module. The computing system 800 includes a bus 805 or other communication component for communicating information and a processor 810 or processing circuit coupled to the bus 805 for processing information. The computing system 800 can also include one or more processors 810 or processing circuits coupled to the bus for processing information. The computing system 800 also includes main memory 815, such as a random access memory (RAM) or other dynamic storage device, coupled to the bus 805 for storing information, and instructions to be executed by the processor 810. Main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, is coupled to the bus 805 for persistently storing information and instructions.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information and command selections to the processor 810. In another implementation, the input device 830 has a touch screen display 835. The input device 830 can include a cursor control, such as a mouse, a trackball, or cursor direction keys, for communicating direction information and command selections to the processor 810 and for controlling cursor movement on the display 835.

According to various implementations, the processes described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. In alternative implementations, hard-wired circuitry may be used in place of or in combination with software instructions to effect illustrative implementations. Thus, implementations are not limited to any specific combination of hardware circuitry and software.

Although a computing system has been described in FIG. 8, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including without limitation a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, sub programs, or portions of code). A computer program can be deployed to be executed on one computer or on multiple computers that are located at one site or distributed across multiple sites and interconnected by a communication network.

Processors suitable for the execution of a computer program include, without limitation, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including without limitation semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; in most implementations, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, "at least one of A and B" (or, equivalently, "at least one of A or B," or, equivalently "at least one of A and/or B") can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of selecting content for display on a user device via a computer network, comprising:
   receiving, from a content provider associated with a content item and by a data processing system having one or more processors, content selection criteria specifying types of queries that make the content item eligible to be selected for display along with search results responsive to queries matching the specified types of queries;
   determining, by a query reference module of the data processing system via a data structure having information about entities, a content selection criteria entity associated with the content selection criteria and one or more related entities that do not appear in the content selection criteria but are related to the content selection criteria entity in the data structure;
   generating, using the data structure, a content selection criteria structure that includes an entry for the content selection criteria entity, an entry for each entity related to the content selection criteria entity, and a connection between each pair of related entities in the content selection criteria structure, the generated content selection criteria structure being separate from the data structure;
   receiving, by the data processing system, a search query provided via a user device;
   determining, by the query reference module via the data structure, a search query entity, and one or more related entities that do not appear in the search query but are related, in the data structure, to the search query entity;
   generating a query structure that includes an entry for the search query entity, an entry for each entity related to the search query entity, and a connection between each pair of related entities in the query structure, the generated query structure being separate from the content selection criteria structure and the data structure;
   determining a match between the content selection criteria structure and the query structure, including matching a topology and content of the content selection criteria structure to a topology and content of the query structure; and
   selecting the content item as a candidate for display on the user device based on the match between the content selection criteria structure and the query structure.

2. The method of claim 1, wherein the content selection criteria structure and the query structure each comprise a graph, the method further comprising:
   comparing, on a node-by-node basis, the content selection criteria structure with the query structure to determine the match.

3. The method of claim 1, further comprising:
   translating properties of the search query entity into a flat data structure comprising information associated with the properties; and
   identifying, using the flat data structure, a plurality of content selection criteria associated with the flat data structure.

4. The method of claim 3, further comprising:
   comparing each of the plurality of content selection criteria with the properties of the search query entity to identify matching content selection criteria.

5. The method of claim 1, further comprising:
   matching one or more entities related to the content selection criteria entity with one or more entities related to the search query entity.

6. A system for selecting content for display on a user device via a computer network, comprising:
   an interface module of a data processing system having one or more processors configured to:
   receive, from a content provider associated with a content item, content selection criteria specifying types of queries that make the content item eligible to be selected for display along with search results responsive to queries matching the specified types of queries; and receive a search query provided via a user device;

a query reference module of the data processing system configured to:

determine via a data structure having information about entities, a content selection criteria entity associated with the content selection criteria and one or more related entities that do not appear in the content selection criteria but are related to the content selection criteria entity in the data structure;

generate, using the data structure, a content selection criteria structure that includes an entry for the content selection criteria entity, an entry for each entity related to the content selection criteria entity, and a connection between each pair of related entities in the content selection criteria structure, the generated content selection criteria structure being separate from the data structure;

determine, via the data structure, a search query entity, and one or more related entities that do not appear in the search query but are related, in the data structure, to the search query entity;

generate a query structure that includes an entry for the search query entity, an entry for each entity related to the search query entity, and a connection between each pair of related entities in the query structure, the generated query structure being separate from the content selection criteria structure and the data structure;

a matching module of the data processing system configured to determine a match between the content selection criteria structure and the query structure, including matching a topology and content of the content selection criteria structure to a topology and content of the query structure; and a content selector of the data processing system configured to select the content item as a candidate for display on the user device based on the match between the content selection criteria structure and the query structure.

7. The system of claim 6, wherein the data processing system is further configured to:

translate properties of the search query entity into a flat data structure comprising information associated with the properties; and identify, using the flat data structure, a plurality of content selection criteria associated with the flat data structure.

8. The system of claim 7, wherein the data processing system is further configured to:

compare each of the plurality of content selection criteria with the properties of the search query entity to identify matching content selection criteria.

9. The system of claim 6, wherein the data processing system is further configured to:

match one or more entities related to the content selection criteria entity with one or more entities related to the search query entity.

10. A computer-readable storage device comprising processor executable instructions to select content via a computer network, the instructions further comprising instructions to:

receive, from a content provider associated with a content item and by a data processing system having one or more processors, content selection criteria specifying types of queries that make the content item eligible to be selected for display along with search results responsive to queries matching the specified types of queries;

determine, by a query reference module of the data processing system via a data structure having information about entities, a content selection criteria entity and one or more related entities that do not appear in the content selection criteria but are related to the content selection criteria entity in the data structure;

generate, using the data structure, a content selection criteria structure that includes an entry for the content selection criteria entity, an entry for each entity related to the content selection criteria entity, and a connection between each pair of related entities in the content selection criteria structure, the generated content selection criteria structure being separate from the data structure;

receive, by the data processing system, a search query provided via a user device;

determine, by the query reference module via the data structure, a search query entity, and one or more related entities that do not appear in the search query but are related, in the data structure, to the search query entity;

generate a query structure that includes an entry for the search query entity, an entry for each entity related to the search query entity, and a connection between each pair of related entities in the query structure, the generated query structure being separate from the content selection criteria structure and the data structure;

determine a match between the content selection criteria structure and the query structure, including matching a topology and content of the content selection criteria structure to a topology and content of the query structure; and select the content item as a candidate for display on the user device based on the match between the content selection criteria structure and the query structure.

* * * * *